United States Patent
Mirica et al.

(10) Patent No.: US 12,203,883 B2
(45) Date of Patent: Jan. 21, 2025

(54) CONDUCTIVE BIMETALLIC METAL-ORGANIC FRAMEWORKS FOR THE DETECTION OF ANALYTES

(71) Applicant: Trustees of Dartmouth College, Hanover, NH (US)

(72) Inventors: Katherine A. Mirica, Hanover, NH (US); Zheng Meng, West Lebanon, NH (US); Aylin Aykanat, Norwich, VT (US)

(73) Assignee: Trustees of Dartmouth College, Hanover, NH (US)

( * ) Notice: Subject to any disclaimer, the term of this patent is extended or adjusted under 35 U.S.C. 154(b) by 981 days.

(21) Appl. No.: 17/268,996

(22) PCT Filed: Aug. 19, 2019

(86) PCT No.: PCT/US2019/047010
§ 371 (c)(1),
(2) Date: Feb. 17, 2021

(87) PCT Pub. No.: WO2020/037310
PCT Pub. Date: Feb. 20, 2020

(65) Prior Publication Data
US 2021/0310971 A1    Oct. 7, 2021

Related U.S. Application Data

(60) Provisional application No. 62/719,264, filed on Aug. 17, 2018.

(51) Int. Cl.
*G01N 27/12* (2006.01)

(52) U.S. Cl.
CPC ......... *G01N 27/126* (2013.01); *G01N 27/127* (2013.01)

(58) Field of Classification Search
CPC ........ G01N 27/02; G01N 27/04; G01N 27/06; G01N 27/12; G01N 27/125; G01N 27/126;
(Continued)

(56) References Cited

U.S. PATENT DOCUMENTS 9,290,518 B2    3/2016  Banerjee et al.
9,512,270 B2   12/2016  Kumagai et al.
(Continued)

FOREIGN PATENT DOCUMENTS

CN         106673992 A      5/2017
WO     WO-2019032804 A1    2/2019
(Continued)

OTHER PUBLICATIONS

Campbell et al. "Metal—Organic Frameworks as Active Materials in Electronic Sensor Devices." Sensors, May 12, 2017. (Year: 2017).*
(Continued)

*Primary Examiner* — Benjamin R Schmitt
(74) *Attorney, Agent, or Firm* — Shackelford, McKinley & Norton, LLP

(57) ABSTRACT

The present disclosure pertains to a bimetallic metal-organic framework. The bimetallic metal-organic framework includes a plurality of first metals and a plurality of metal-containing ligands, where each metal-containing ligand includes a second metal and a ligand. The ligand is coordinated with the second metal and at least one first metal. The present disclosure also pertains to a method of detecting an analyte in a sample by associating the sample with a bimetallic metal-organic framework, detecting a change in a property of the bimetallic metal-organic framework, and
(Continued)

correlating the change in the property of the bimetallic metal-organic framework to the presence or absence of the analyte in the sample.

19 Claims, 30 Drawing Sheets

(58) Field of Classification Search
CPC .... G01N 27/127; G01N 27/128; G01N 27/22; G01N 27/227
See application file for complete search history.

(56) References Cited

U.S. PATENT DOCUMENTS

| | | |
|---|---|---|
| 9,707,540 B2 | 7/2017 | Van Der Boom et al. |
| 2009/0169857 A1 | 7/2009 | Fischer et al. |
| 2010/0132547 A1* | 6/2010 | Masel .................. B01J 20/3265 95/90 |
| 2016/0084810 A1* | 3/2016 | Kambhampati ....... B05D 5/061 436/501 |
| 2018/0306740 A1 | 10/2018 | Mirica et al. |
| 2020/0361976 A1 | 11/2020 | Mirica et al. |

FOREIGN PATENT DOCUMENTS

| | | |
|---|---|---|
| WO | WO-2019033104 A1 | 2/2019 |
| WO | WO-2019236799 A1 | 12/2019 |
| WO | WO-2020037310 A1 | 2/2020 |
| WO | WO-2020055474 A2 | 3/2020 |

OTHER PUBLICATIONS

Yan et al. "Lanthanide homometallic and d—f heterometallic MOFs from the same tripodal ligand: structural comparison, one photon (OP) vs. two photon (TP) luminescence and selective guest adsorption behavior." Journal of Materials Chemistry, Apr. 13, 2012. (Year: 2012).*
Miner et al. "Electrochemical oxygen reduction catalysed by Ni3(hexaiminotriphenylene)2"—Nature Communications, Mar. 8, 2016 (Year: 2016).*
International Search Report and Written Opinion for PCT/US19/47010, mailed on Dec. 17, 2019.
International Preliminary Report on Patentability for PCT/US19/47010, mailed on Mar. 4, 2021.
Mirica et al. "Conductive Two-Dimensional Metal-Organic Frameworks as Multifunctional Materials." Chemical Communications, vol. 54, No. 57, Jul. 12, 2018, pp. 7873-7891., doi: 10.1039/c8cc02871k.
Wang et al. "Bioinspired Design of Ultrathin 2D Bimetallic Metal-Organic-Framework Nanosheets Used as Biomimetic Enzymes." Advanced Materials, vol. 28, No. 21, 2016, pp. 4149-4155., doi:10.1002/adma.201600108.
Chen et al. "Formation of Bimetallic Metal-Organic Framework Nanosheets and Their Derived Porous Nickel-Cobalt Sulfides for Supercapacitors." Dalton Transactions, vol. 47, No. 16, Apr. 24, 2018, pp. 5639-5645., doi: 10.1039/c8dt00464a.

De la Torre, G.; Claessens, C. G.; Torres, T., Phthalocyanines: old dyes, new materials. Putting color in nanotechnology, Chem. Commun. 2007, 2000-2015.
Jurow, M.; Schuckman, A. E.; Batteas, J. D.; Drain, C. M., Porphyrins as Molecular Electronic Components of Functional Devices, Coord. Chem. Rev. 2010, 254, 2297-2310.
Bottari, G.; de la Torre, G.; Guldi, D. M.; Torres, T., Covalent and noncovalent phthalocyanine-carbon nanostructure systems: synthesis, photoinduced electron transfer, and application to molecular photovoltaics, Chem. Rev. 2010, 110, 6768-816.
De la Torre, G.; Vazquez, P.; Agullo-Lopez, F.; Torres, T., Role of Structural Factors in the Nonlinear Optical Properties of Phthalocyanines and Related Compounds, Chem. Rev. 2004, 104, 3723-50.
Cid, J. J.; Yum, J. H.; Jang, S. R.; Nazeeruddin, M. K.; Martinez-Ferrero, E.; Palomares, E.; Ko, J.; Gratzel, M.; Torres, T., Molecular cosensitization for efficient panchromatic dye-sensitized solar cells, Angew. Chem. Int. Ed. 2007, 46, 8358-62.
Campidelli, S.; Ballesteros, B.; Filoramo, A.; Diaz, D. D.; de la Torre, G.; Torres, T.; Rahman, G. M.; Ehli, C.; Kiessling, D.; Werner, F.; Sgobba, V.; Guldi, D. M.; Cioffi, C.; Prato, M.; Bourgoin, J. P., 9-Borabicyclo[3.3.2] decanes and the Asymmetric Hydroboration of 1, 1-Disubstituted Alkenes, J. Am. Chem. Soc. 2008, 130, 11503-9.
Sorokin, A. B., Phthalocyanine metal complexes in catalysis, Chem. Rev. 2013, 113, 8152-91.
Ozturk, Z. Z.; Kilinc, N.; Atilla, D.; Gurek, A. G.; Ahsen, V., Recent studies chemical sensors based on phthalocyanines, J. Porphyrins Phthalocyanines 2009, 13, 1179-1187.
Zhou, R.; Josse, F.; Gopel, W.; Ozturk, Z. Z.; Bekaroglu, O, Phthalocyanines as Sensitive Materials for Chemical Sensors Appl. Organomet. Chem. 1996, 10, 557-577.
Guillaud, G.; Simon, J.; Germain, J. P., Metallophthalocyanines: Gas sensors, resistors and field effect transistors, Coord. Chem. Rev. 1998, 178-180, 1433-1484.
Lu, H.; Kobayashi, N., Optically Active Porphyrin and Phthalocyanine Systems, Chem. Rev. 2016, 116, 6184-261.
Paolesse, R.; Nardis, S.; Monti, D.; Stefanelli, M.; Di Natale, C., Porphyrinoids for Chemical Sensor Applications, Chem. Rev. 2017, 117, 2517-2583.
Bohrer, F. I.; Sharoni, A.; Colesniuc, C.; Park, J.; Schuller, I. K.; Kummel, A. C.; Trogler, W. C., Gas sensing mechanism in chemiresistive cobalt and metal-free phthalocyanine thin films, J. Am. Chem. Soc. 2007, 129, 5640-6.
Miedema, P. S.; van Schooneveld, M. M.; Bogerd, R.; Rocha, T. C. R.; Havecker, M.; Knop-Gericke, A.; de Groot, F. M. F., The Journal of Physical Chemistry C 2011, 115, 25422-25428.
Mukherjee, D.; Manjunatha, R.; Sampath, S.; Ray, A. K., Phthalocyanines as Sensitive Materials for Chemical Sensors. In Materials for Chemical Sensing, 2017; pp. 165-226.
Koval, I. A.; Gamez, P.; Belle, C.; Selmeczi, K.; Reedijk, J., Synthetic models of the active site of catechol oxidase: mechanistic studies, Chem. Soc. Rev. 2006, 35, 814-40.
Wu, S.; Wen, G.; Schlogl, R.; Su, D. S., Carbon nanotubes oxidized by a green method as efficient metal-free catalysts for nitroarene reduction, Phys. Chem. Chem. Phys. 2015, 17, 1567-71.
Qi, W.; Liu, W.; Zhang, B.; Gu, X.; Guo, X.; Su, D., Oxidative dehydrogenation on nanocarbon: identification and quantification of active sites by chemical titration, Angew. Chem. Int. Ed. 2013, 52, 14224-8.

\* cited by examiner

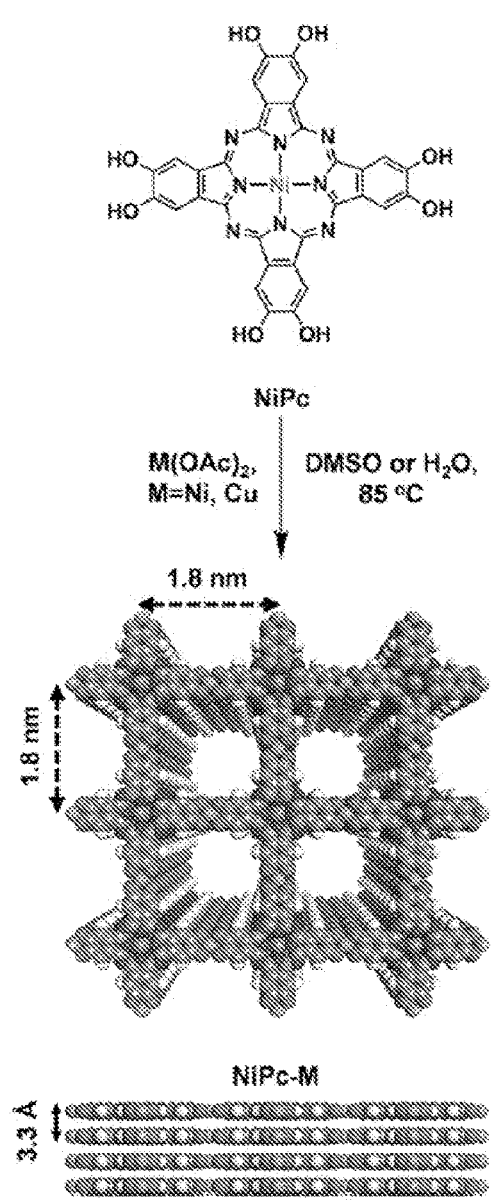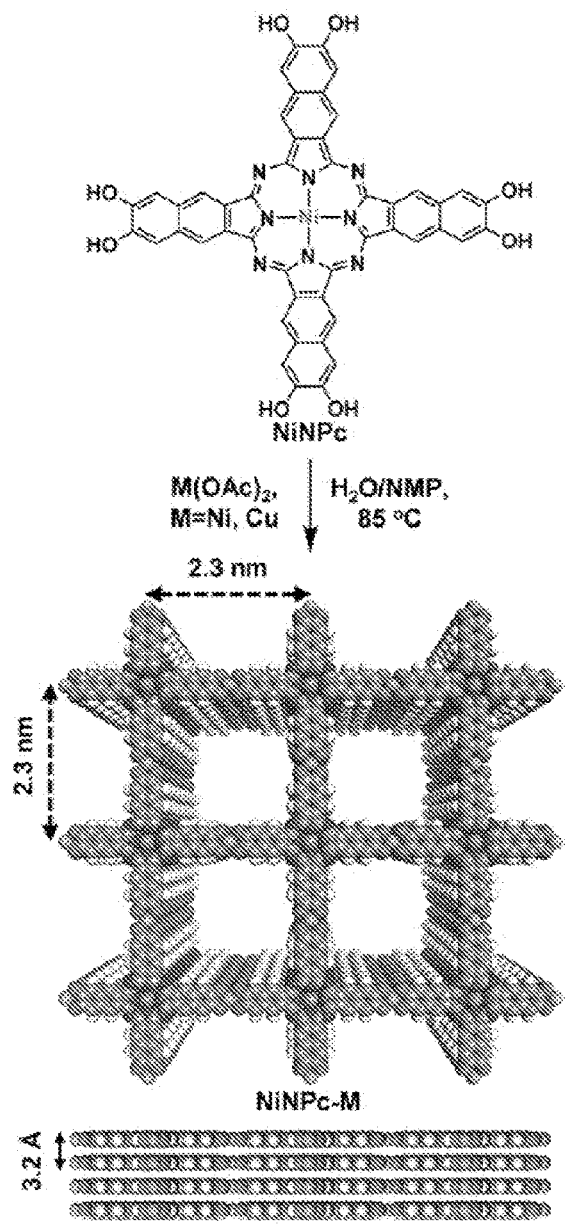
FIG. 2A
FIG. 2B (100)

Simulated eclipsed

Simulated staggered

CONDUCTIVE BIMETALLIC METAL-ORGANIC FRAMEWORKS FOR THE DETECTION OF ANALYTES

CROSS-REFERENCE TO RELATED APPLICATIONS

This application claims priority to U.S. Provisional Patent Application No. 62/719,264, filed on Aug. 17, 2018. The entirety of the aforementioned application is incorporated herein by reference.

STATEMENT REGARDING FEDERALLY SPONSORED RESEARCH

This invention was made with government support under W911NF-17-1-0398 awarded by the Department of Defense. The government has certain rights in the invention.

BACKGROUND

Current chemiresistors face several challenges. Such challenges include limited electrical conductivity, limited homogeneous structures, limited control over spatial distribution of the structures, limited fabrication methods, and limited sensitivity and specificity in analyte detection. The present disclosure addresses the aforementioned challenges.

SUMMARY

In some embodiments, the present disclosure pertains to a bimetallic metal-organic framework. In some embodiments, the bimetallic metal-organic framework includes a plurality of first metals and a plurality of metal-containing ligands, where each metal-containing ligand includes a second metal and a ligand. In some embodiments, the ligand is coordinated with the second metal and at least one first metal.

In some embodiments, the present disclosure pertains to a method of detecting an analyte in a sample. In some embodiments, the method includes associating the sample with a bimetallic metal-organic framework of the present disclosure, detecting a change in a property of the bimetallic metal-organic framework, and correlating the change in the property of the bimetallic metal-organic framework to the presence or absence of the analyte in the sample.

In some embodiments, the present disclosure pertains to a method of making a bimetallic metal-organic framework of the present disclosure. In some embodiments, the method includes associating a plurality of metal-containing ligands and first metals with one another. In some embodiments, each metal-containing ligand includes a second metal that is coordinated with a ligand. In some embodiments, the associating results in the coordination of the ligand with the first metals to form the bimetallic metal-organic framework. In some embodiments, the method further includes a step of forming metal-containing ligands by associating the second metal with the ligand. In some embodiments, the method also includes a step of associating the bimetallic metal-organic framework with at least one electrode component.

DESCRIPTION OF THE DRAWINGS

FIGS. 2A-2B illustrate synthetic schemes for isoreticular phthalocyanine and naphthalocyanine-based metal-organic frameworks (MOFs): NiPc-M depicted in FIG. 2A and NiNPc-M depicted in FIG. 2B. The top and side view of their structures with 2×2 square grids in eclipsed stacking mode is also shown.

DETAILED DESCRIPTION

Figure 1A:
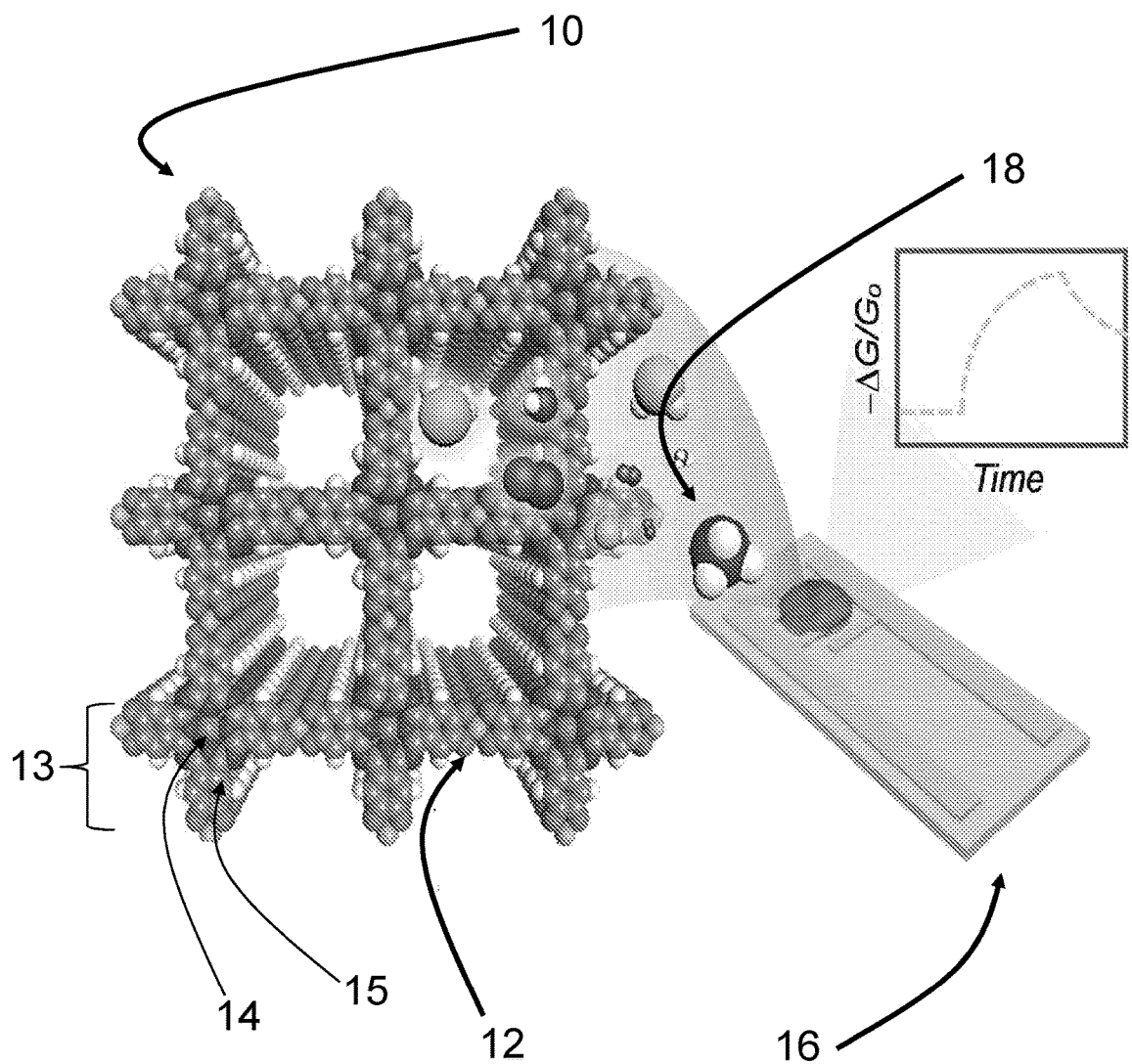
FIG. 1A depicts a bimetallic metal-organic framework (MOF) according to an aspect of the present disclosure.

It is to be understood that both the foregoing general description and the following detailed description are illustrative and explanatory, and are not restrictive of the subject matter, as claimed. In this application, the use of the singular includes the plural, the word "a" or "an" means "at least one", and the use of "or" means "and/or", unless specifically stated otherwise. Furthermore, the use of the term "including", as well as other forms, such as "includes" and "included", is not limiting. Also, terms such as "element" or "component" encompass both elements or components comprising one unit and elements or components that include more than one unit unless specifically stated otherwise.

The section headings used herein are for organizational purposes and are not to be construed as limiting the subject matter described. All documents, or portions of documents, cited in this application, including, but not limited to, patents, patent applications, articles, books, and treatises, are hereby expressly incorporated herein by reference in their entirety for any purpose. In the event that one or more of the incorporated literature and similar materials defines a term in a manner that contradicts the definition of that term in this application, this application controls.

The discovery and development of new multifunctional nanomaterials, in which two or more properties coexist, can enable unprecedented approaches to addressing challenges in electronics, chemical sensing, and energy conversion and storage. Metallophthalocyanines constitute at least one important class of such multifunctional materials. The bulk, thin film, and nanowire forms of these molecular solids exhibit remarkable properties, such as, for example, charge transport, field-effect, and unique light-matter interactions, all of which can be modulated by straightforward changes in molecular structure. Despite the promising performance of metallophthalocyanines in electronics, sensing, and energy-related applications, their functional utility is limited by their low intrinsic conductivity and difficulty in spatial alignment and orientation of metallophthalocyanine units within solid-state devices.

Although the use of composites of metallophthalocyanines with graphitic materials and the integration of metallophthalocyanine units into metal-organic frameworks and covalent-organic frameworks have shown promise for increasing conductivity and ordered assembly within devices, the ability to design and evolve synergistic integration of multiple properties within metallophthalocyanine-based systems remains limited. Overcoming these limitations requires the development of efficient and modular methods for bottom-up assembly of structurally diverse metallophthalocyanine-based materials with precise control over chemical composition, molecular architecture, and emerging properties.

Additionally, current challenges of the industrialized and fossil-powered economy demand the design and synthesis of new materials for portable sensors of toxic gases, such as carbon monoxide and nitrogen oxides. Produced from the incomplete combustion of petroleum-based fuels, NO and CO remain among the highest toxicological causes of death worldwide. While hazardous gas detectors based on metal oxide semiconductors, microelectro-mechanical systems, and mid-infrared spectroscopy techniques are currently available, there is a growing need for the intensive distribution of low-power, ultra-sensitive, rapid, and inexpensive devices that can detect toxic gases before exposures become fatal.

Commercial detectors based on metal-oxide thin film technology, which implement oxidation-reduction reactions at the surface of the material, enable detection of various gaseous analytes through charge transfer mechanisms. However, many metal oxide-based sensors require high operating temperatures to achieve sensitivity and doping with metals to improve the selectivity. These processes restrict miniaturization and mobile deployment.

Additionally, it remains difficult for metal-oxide gas sensors to discriminate between toxic gases that oxidize to their dioxide counterparts (e.g., CO and NO) using oxygen bound ions at their surfaces. Thus, new materials with the potential to significantly advance the fabrication of low-power portable sensors are needed.

In sum, a need exists for more effective systems and methods for ultra-sensitive and low-power chemical sensing. Various embodiments of the present disclosure address the aforementioned need.

In some embodiments, the present disclosure pertains to bimetallic metal-organic frameworks. An example of a bimetallic metal-organic framework is illustrated in FIG. 1A as bimetallic metal-organic framework 10, which contains a plurality of first metals 12 and a plurality of metal-containing ligands 13, where each metal-containing ligand includes a second metal 14 and a ligand 15. In this embodiment, ligands 15 are coordinated with second metals 14 and first metals 12 to form a lattice structure.

In further embodiments illustrated in FIG. 1A, bimetallic metal-organic framework 10 is associated with an electrode component 16 for the detection of analytes 18. In some embodiments, electrode component 16 can be part of a chemiresistor or other chemical sensing device.

Figure 1B:
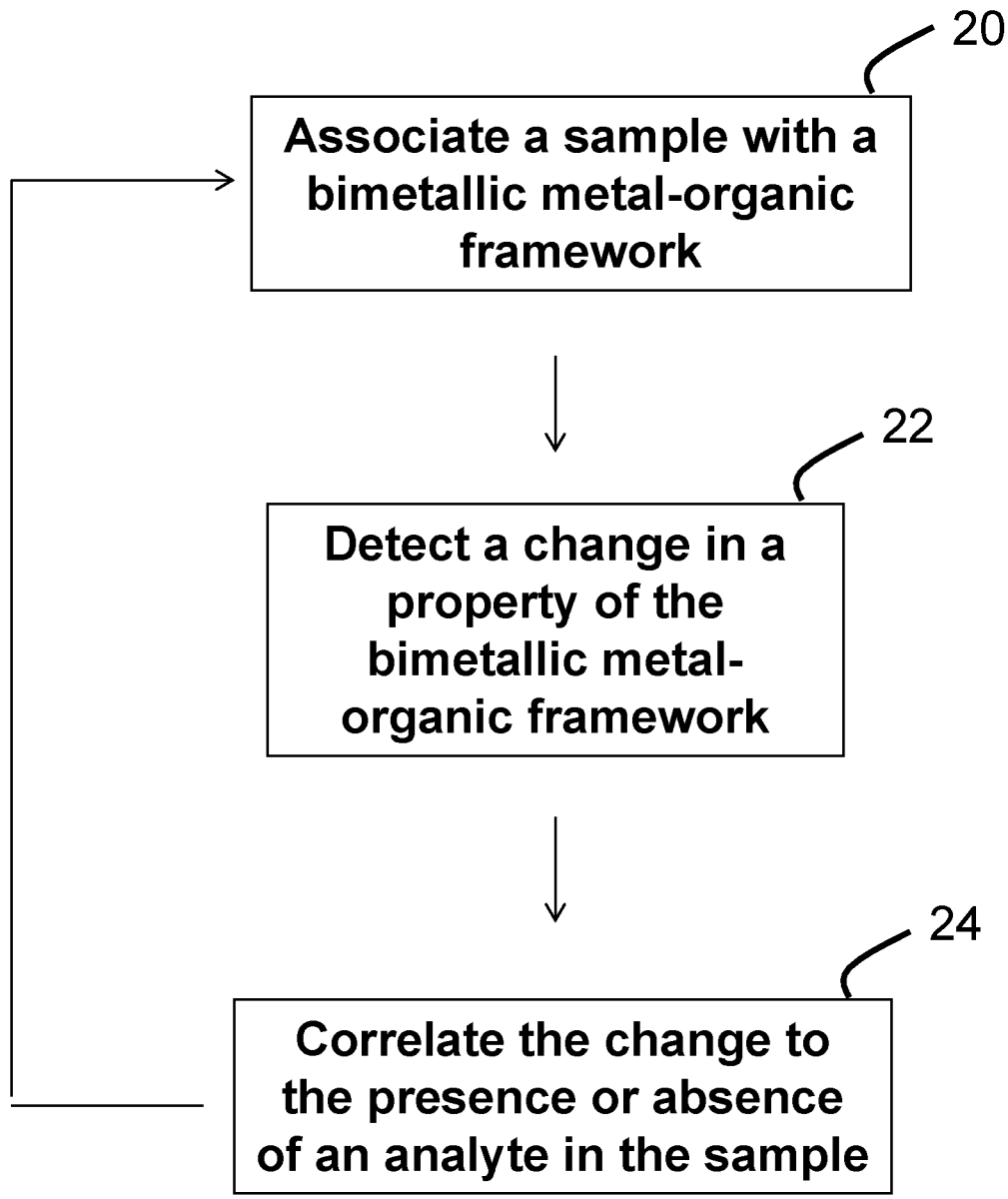
FIG. 1B illustrates a method of detecting analytes in a sample according to an aspect of the present disclosure.

Additional embodiments of the present disclosure pertain to methods of detecting analytes in a sample. In some embodiments illustrated in FIG. 1B, the methods of the present disclosure include a step of associating a sample with a bimetallic metal-organic framework of the present disclosure (step 20), detecting a change in a property of the bimetallic metal-organic framework (step 22), and correlating the change in the property of the bimetallic metal-organic framework to the presence or absence of an analyte in the sample (step 24). Thereafter, in some embodiments, the methods of the present disclosure can be repeated after step 24 to detect additional analytes.

Figure 1C:
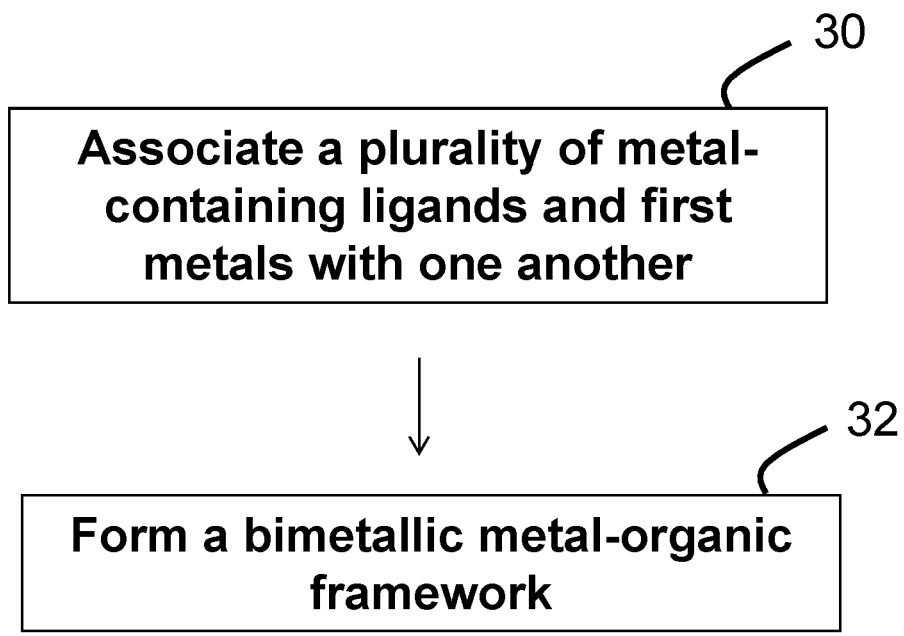
FIG. 1C illustrates a method of forming a bimetallic metal-organic framework according to an aspect of the present disclosure.

Further embodiments of the present disclosure pertain to methods of making the bimetallic metal-organic frameworks of the present disclosure. In some embodiments illustrated in FIG. 1C, the methods of the present disclosure involve associating a plurality of metal-containing ligands and first metals with one another (step 30). The associating results in the coordination of the ligand in the metal-containing ligands with the first metals, thereby forming the bimetallic metal-organic frameworks (step 32).

As set forth in more detail herein, the methods and bimetallic metal-organic frameworks of the present disclosure can have numerous embodiments. For instance, the bimetallic metal-organic frameworks of the present disclosure can include various first metals, second metals, ligands, and structures. Additionally, the bimetallic metal-organic frameworks of the present disclosure can be associated with various electrode components and have various properties. Furthermore, various methods may be utilized to detect various analytes in various samples by using the bimetallic metal-organic frameworks of the present disclosure. Various methods may also be utilized to make the bimetallic metal-organic frameworks of the present disclosure.

Bimetallic Metal-Organic Frameworks

As set forth in more detail herein, the bimetallic metal-organic frameworks of the present disclosure can include various first metals, second metals, ligands, and structures. For instance, in some embodiments, the bimetallic metal-organic frameworks of the present disclosure include a plurality of first metals and a plurality of metal-containing ligands, where each metal-containing ligand includes a second metal and a ligand. In some embodiments, the ligand is coordinated with the second metal and at least one first metal.

Moreover, the bimetallic metal-organic frameworks may be associated with various electrode components in numerous manners. In addition, the bimetallic metal-organic frameworks of the present disclosure may have various advantageous properties.

First Metals

The bimetallic metal-organic frameworks of the present disclosure can include various types of first metals. For instance, in some embodiments, the first metals can include, without limitation, divalent metals, transition metals, iron, nickel, copper, cobalt, zinc, manganese, platinum, palladium, gold, bismuth, chromium, magnesium, tin, and combinations thereof.

In some embodiments, the first metals can include, without limitation, cobalt, iron, nickel, copper, and combinations thereof. In some embodiments, the first metals include copper. In some embodiments, the first metals are in a form that can include, without limitation, metal ions, metal clusters, metallic nodes, metal catecholates, metal salts, and combinations thereof. In some embodiments, the first metals are in the form of metallic nodes.

Second Metals

The bimetallic metal-organic frameworks of the present disclosure can also include various types of second metals. For instance, in some embodiments, the second metal can include, without limitation, divalent metals, transition metals, iron, nickel, copper, cobalt, zinc, manganese, platinum, palladium, gold, bismuth, chromium, magnesium, tin, and combinations thereof. In some embodiments, the second metal can include, without limitation, nickel, cobalt, and combinations thereof.

In some embodiments, the second metals are the same as the first metals. In some embodiments, the second metals are different from the first metals. For instance, in some embodiments, the first metals include copper while the second metals include, without limitation, cobalt, nickel, and combinations thereof.

Ligands

The bimetallic metal-organic frameworks of the present disclosure can also include various types of ligands. For instance, in some embodiments, the ligand can include, without limitation, organic ligands, hexatopic ligands, octatopic ligands, polydentate ligands, aromatic ligands, phthalocyanine-based ligands, metallophthalocyanine-based ligands (MPc), naphthalocyanine-based ligands, metallonaphthalocyanine-based ligands (MNPc), porphyrin-based ligands, metalloporphyrin-based ligands (MPP), tridentate ligands, triphenylene-based ligands, triphenylene derivatives, hexahydroxytriphenylene-based organic linkers, hexaiminotriphenlyene-based organic linkers, thiol-based ligands, and combinations thereof.

In some embodiments, the ligand can include, without limitation, metallophthalocyanine-based ligands (MPc), metallonaphthalocyanine-based ligands (MNPc), and combinations thereof.

Structures

The bimetallic metal-organic frameworks of the present disclosure can have various types of structures. For instance, in some embodiments, the bimetallic metal-organic framework is in the form of a lattice structure, a two-dimensional structure, a crystalline structure, a layered structure, or combinations thereof.

In some embodiments, the ligands of metal-containing ligands of bimetallic metal-organic frameworks include a central portion, a first end, and a second end. In some embodiments, the first end and the second end are on opposite ends of the central portion. In some embodiments, the central portion is coordinated with the second metal. In some embodiments, the first end and the second end are each coordinated with the first metals. In some embodiments, the central portion is only coordinated with the second metal while the first end and the second end are each only coordinated with the first metals.

In some embodiments, the first metals include first metals that are each coordinated with at least two ligands. In some embodiments, the bimetallic metal-organic framework includes a network of metal-containing ligands (e.g., a network of metal-containing ligands 14, as shown in FIG. 1A) that are interconnected with one another through coordination of ligands with first metals (e.g., coordination of ligands 15 with first metals 12, as shown in FIG. 1A).

In some embodiments, the bimetallic metal-organic framework is in the form of a lattice structure (e.g., lattice structure shown in FIG. 1A). In some embodiments, the bimetallic metal-organic framework is in the form of a two-dimensional structure. In some embodiments, the bimetallic metal-organic framework is in the form of a crystalline structure. In some embodiments, the bimetallic metal-organic framework is in the form of a layered structure. In some embodiments, the bimetallic metal-organic framework is in the form of crystalline thin film. In some embodiments, the bimetallic metal-organic framework is in the form of nanocrystals grown on substrates.

Electrode Components

The bimetallic metal-organic frameworks of the present disclosure can be associated with various electrode components in various manners. For instance, in some embodiments, the bimetallic metal-organic framework is associated with at least one electrode component. In some embodiments, the electrode component includes an electrode surface. In some embodiments, the electrode surface can include, without limitation, a conductive substrate, a carbon-based substrate, glassy carbon, and combinations thereof. In some embodiments, the bimetallic metal-organic framework serves as an electrode surface.

Bimetallic Metal-Organic Framework Properties

The bimetallic metal-organic frameworks of the present disclosure can have various properties. For instance, in some embodiments, the bimetallic metal-organic frameworks have a conductivity of about $10^{-2}$ S/cm. In some embodiments, the bimetallic metal-organic frameworks have a conductivity of less than about $10^{-2}$ S/cm. In some embodiments, the bimetallic metal-organic frameworks have a surface area of at least about 100 $m^2/g$.

In some embodiments, the bimetallic metal-organic framework serves as an electrocatalyst. In some embodiments, the bimetallic metal-organic framework mediates an electrocatalysis of an analyte to be detected. In some embodiments, the electrocatalysis can be utilized to facilitate the detection of the analyte.

Methods of Detecting Analytes in a Sample

The bimetallic metal-organic frameworks of the present disclosure may be utilized to detect analytes in a sample in various manners. For example, in some embodiments, the presence or absence of an analyte can be detected in a sample by associating the sample with a bimetallic metal-organic framework and detecting a change in a property of the bimetallic metal-organic framework. Thereafter, the method includes correlating the change in the property of the bimetallic metal-organic framework to the presence or absence of the analyte in the sample.

As set forth in more detail herein, various methods may be utilized to associate various samples with bimetallic metal-organic frameworks in order to detect the presence or absence of various analytes.

Associating Samples with Bimetallic Metal-Organic Frameworks

Various methods may be utilized to associate samples with the bimetallic metal-organic frameworks of the present disclosure. For instance, in some embodiments, the associating occurs by methods that include, without limitation, flowing the sample through the bimetallic metal-organic framework, incubating the sample with the bimetallic metal-organic framework, incubating the sample with the bimetallic metal-organic framework, and combinations thereof. In some embodiments, the associating occurs by flowing the sample through the bimetallic metal-organic framework.

Samples for Analyte Detection

Various samples and sample types may be associated with the bimetallic metal-organic frameworks of the present disclosure for the detection of analytes. For instance, in some embodiments, the sample is in a gaseous form, a liquid form, a solid form, or combinations of such forms. In some embodiments, the sample is in a liquid form. In some embodiments, the sample is in a gaseous form.

Detecting Changes in Properties of Bimetallic Metal-Organic Frameworks

Various changes in the properties of the bimetallic metal-organic frameworks can be utilized to identify the presence or absence of the analyte in the sample. For instance, in some embodiments, the change in the property of the bimetallic metal-organic framework includes a change in normalized conductance of the bimetallic metal-organic framework. In some embodiments, the change in normalized conductance is characterized by the following formula: $-\Delta G/G_0 = -(I_0-I)/I_0 \times 100\%$.

Correlation for Analyte Detection

Various methods may also be utilized to correlate the changes in properties of the bimetallic metal-organic frameworks of the present disclosure to the presence or absence of an analyte in a sample. For instance, in some embodiments, the correlating includes comparing the change in the property of the bimetallic metal-organic framework to properties of bimetallic metal-organic frameworks associated with known analytes. In some embodiments, the comparing occurs by comparing the change in the property of the bimetallic metal-organic framework to a database including properties of bimetallic metal-organic framework associated with known analytes.

Analytes

The methods of the present disclosure can be utilized to detect various analytes. For instance, in some embodiments, the analyte can include, without limitation, $NH_3$, $H_2S$, CO, NO, and combinations thereof. In some embodiments, the analyte is in a gaseous state, a liquid state, or combinations of such states.

In some embodiments, the analyte is detectable at concentrations that range from about 10 nM to about 100 μM. In some embodiments, the analyte is detectable at concentrations that range from about 10 nM to about 100 nM. In some embodiments, the analyte is detectable at concentrations of part-per-million. In some embodiments, the analyte is detectable at concentrations of sub-part-per-million. In some embodiments, the analyte is detectable at concentrations of part-per-billion.

In some embodiments, the methods of the present disclosure are utilized for the simultaneous detection of a plurality of different analytes. In some embodiments, the methods of the present disclosure are utilized to quantify the concentration of an analyte.

In some embodiments, the methods of the present disclosure are utilized for the selective detection of analytes in the presence of water. In some embodiments, the methods of the present disclosure are utilized for the selective detection of analytes in the presence of humidity. In some embodiments, the humidity is characterized by the presence of at least 5,000 ppm of $H_2O$.

In some embodiments, the methods of the present disclosure occur while applying a voltage to the bimetallic metal-organic frameworks of the present disclosure. In some embodiments, the applied voltage is less than about 5.0 V. In some embodiments, the applied voltage is less than about 2.0 V. In some embodiments, the applied voltage is less than or equal to about 1.0V. In some embodiments, the applied voltage ranges from about 0.01V to about 1.0 V.

Methods of Making Bimetallic Metal-Organic Frameworks

Additional embodiments of the present disclosure pertain to methods of making the bimetallic metal-organic frameworks of the present disclosure. Such methods generally include associating a plurality of metal-containing ligands and first metals with one another. The metal-containing ligands include a second metal and a ligand. The associating results in the coordination of the ligand with at least one first metal to form the bimetallic metal-organic framework.

In some embodiments, the metal-containing ligands, the first metals, the second metal, and the ligand can be one or more of the metal-containing ligands, the first metals, the second metals, and the ligands as discussed in detail above. In some embodiments, the bimetallic metal-organic frameworks formed can be a bimetallic metal-organic framework as discussed above. Additionally, in some embodiments, the bimetallic-metal organic frameworks formed can have structures similar to that as discussed above.

As set forth in more detail herein, various methods may be utilized to form the bimetallic metal-organic frameworks of the present disclosure. Various methods may also be utilized to associate the formed bimetallic metal-organic frameworks with electrode components.

Associating

Various methods can be utilized to associate metal-containing ligands and first metals with one another to form the bimetallic metal-organic frameworks of the present disclosure. For instance, in some embodiments, the associating includes mixing the metal-containing ligands and the first metals with one another. In some embodiments, the mixing includes sonication. In some embodiments, the associating includes mixing the metal-containing ligands and the first metals under microwave irradiation. In some embodiments, the associating includes mixing the metal-containing ligands and the first metals deposited on a substrate.

Forming Metal-Containing Ligands

The methods of making the bimetallic metal-organic frameworks of the present disclosure can also include additional steps. For instance, in some embodiments, the methods of the present disclosure can further include forming metal-containing ligands, such as the metal-containing ligands as discussed above. In some embodiments, metal-containing ligands are formed by associating a second metal with a ligand.

In some embodiments, the metal-containing ligands are formed during their association with first metals. In some embodiments, the metal-containing ligands are formed before their association with first metals.

Association with Electrode Components

The methods of making the bimetallic metal-organic frameworks of the present disclosure can include other additional steps. For instance, in some embodiments, the methods of the present disclosure can further include a step of associating the bimetallic metal-organic framework with at least one electrode component. In some embodiments, the electrode component includes an electrode surface. In some embodiments, the associating occurs during the formation of the bimetallic metal-organic framework. In some embodiments, the associating occurs after the formation of the bimetallic metal-organic framework.

Applications and Advantages

The present disclosure can have various applications and advantages. For instance, in some embodiments, the bimetallic metal-organic frameworks of the present disclosure can provide molecularly homogeneous low-dimensional sensing materials with good conductivity, high surface area, and orderly-arranged active sites that can meet the requirements for low-power and ultra-sensitive chemical detection.

In some embodiments, the bimetallic metal-organic frameworks of the present disclosure possess at least four advantages for electronic chemical detection: i) modular molecular design for host-guest interactions; ii) ease of accessibility through bottom-up solution phase synthesis; iii) low dimensionality for maximizing the sensitivity in chemical detection; and iv) good conductivity for electronic transduction of chemical stimuli.

Additionally, the bimetallic nature of the bimetallic metal-organic frameworks of the present disclosure can provide two distinct binding sites for interactions with analytes, thereby enabling modular control over sensitivity and selectivity of metal-organic framework-analyte interactions. The bimetallic metal-organic frameworks of the present disclosure can also exhibit high conductivities and high surface areas. Further, the optimal conductivity of the aforementioned bimetallic metal-organic frameworks enables sensor operation at a low driving voltage. In addition, the bimetallic metal-organic frameworks of the present disclosure can retain their performance in humidity.

Thus, in some embodiments, the use of bimetallic metal-organic frameworks of the present disclosure can achieve ultra-sensitive and selective detection of numerous analytes by strategically programing the interlinking of different modular components within the bimetallic system. As such, the methods and bimetallic metal-organic frameworks of the present disclosure can be utilized in various manners and for various purposes. For instance, in some embodiments, the bimetallic metal-organic frameworks of the present disclosure can be utilized to detect analytes in a sample, even in the presence of interferences (e.g., humidity), other analytes, or combinations thereof.

For instance, the bimetallic metal-organic frameworks of the present disclosure show optimal detection threshold for gaseous analytes, including $NH_3$, $H_2S$, NO, and CO, which are comparable or superior to the best sensors made by graphene and metal oxides. In particular, chemiresistive devices fabricated using the bimetallic metal-organic frameworks of the present disclosure show optimal ability to detect and differentiate gaseous analytes (e.g., $NH_3$, $H_2S$, CO, and NO) with sub-part-per-million limits of detection for $NH_3$ and part-per-billion limits of detection for $H_2S$ and NO at room temperature.

In more specific embodiments, Cu-linked metal-organic frameworks consistently give higher responses to $H_2S$, while Ni-linked metal-organic frameworks give higher responses for NO Likewise, the bimetallic metal-organic frameworks of the present disclosure that include metallophthalocyanines or metallonaphthalocyanines utilize a dual active site structure that enables ultrasensitive detection at sub-part-per-million to part-per-billion level detection for $NH_3$, CO, $H_2S$, and NO. The aforementioned embodiments highlight the potential and unique features of the bimetallic metal-organic frameworks of the present disclosure in modular control over selectivity and sensitivity in chemical sensing.

ADDITIONAL EMBODIMENTS

Reference will now be made to more specific embodiments of the present disclosure and experimental results that provide support for such embodiments. However, Applicants note that the disclosure below is for illustrative purposes only and is not intended to limit the scope of the claimed subject matter in any way.

Example 1. Welding Metallophthalocyanines into Bimetallic Molecular Meshes for Ultrasensitive, Low-Power Chemiresistive Detection of Gases This Example describes the first demonstration of using a series of isoreticular nickel phthalocyanine- and nickel naphthalocyanine-based bimetallic conductive two-dimensional (2D) metal-organic frameworks (MOFs) as active materials in chemiresistive sensing of gases. Devices achieve exceptional sensitivity at sub-part-per-million (ppm) to part-per-billion (ppb) detection limits toward $NH_3$ (0.31-0.33 ppm), $H_2S$ (19-32 ppb), and NO (1.0-1.1 ppb) at low driving voltages (0.01-1.0 V) within 1.5 min of exposure. The devices maintain their performance in the presence of humidity (5000 ppm of $H_2O$). The isoreticular analogs enable modular control over selectivity and sensitivity in gas sensing through different combinations of linkers and metal nodes. Electron paramagnetic resonance spectroscopy and X-ray photoelectron spectroscopy studies suggest that the chemiresistive response of the MOFs involves charge transfer interactions triggered by the analytes adsorbed on MOFs.

Example 1.1. Introduction

The discovery and development of new multifunctional nanomaterials, in which two or more properties coexist, can enable unprecedented approaches to addressing challenges in electronics, chemical sensing, and energy conversion and storage. Metallophthalocyanines (MPcs) constitute one important class of such multifunctional materials. The bulk, thin film, and nanowire forms of these molecular solids exhibit remarkable properties—charge transport, field-effect, and unique light-matter interactions—all of which can be modulated by straightforward changes in molecular structure. Despite the promising performance of MPcs in electronics, sensing, and energy-related applications, their functional utility is limited by their low intrinsic conductivity and difficulty in spatial alignment and orientation of MPc units within solid-state devices.

Although the use of composites of MPcs with graphitic materials and the integration of MPc units into metal-organic frameworks and covalent organic frameworks have shown promise for increasing conductivity and ordered assembly within devices, the ability to design and evolve synergistic integration of multiple properties within MPc-based systems remains limited. Overcoming these limitations requires the development of efficient and modular methods for bottom-up assembly of structurally diverse MPc-based materials with precise control over chemical composition, molecular architecture, and emerging properties.

This Example describes a modular strategy for the integration of MPc-based building blocks into bimetallic two-dimensional (2D) metal-organic frameworks (MOFs). The resulting 2D meshes (FIGS. 2A-B) exhibit a synergistic combination of multi-functionality: optimal conductivity, low-dimensionality, high surface area, and ordered arrangement of active sites on the nanoscale.

Access to these materials enables three innovations in chemical sensing. First, Applicants demonstrate ultrasensitive detection by combining the intrinsic conductivity of these materials with electronic transduction of chemical interactions. Chemiresistive sensors show optimal ability to detect and differentiate gaseous analytes ($NH_3$, $H_2S$, and NO). The observed limits of detection (LODs) based on 1.5 min analyte exposure are below part-per-million (ppm) for $NH_3$ (0.31-0.33 ppm) and part-per-billion (ppb) for $H_2S$ (19-32 ppb) and NO (1.0-1.1 ppb) at room temperature. These LODs rival best MOF-based sensors for the detection of $NH_3$, and constitute the best MOF-based chemiresistive sensors for $H_2S$ and NO. Second, using isoreticular analogs of metallophthalocyanines and metallonaphthalocyanines, Applicants achieve modular control of sensitivity and selectivity in chemical sensing of NO and $H_2S$. Third, the optimal intrinsic conductivity (up to $10^{-2}$ S cm$^{-1}$) of these MOFs permits sensor operation at a low driving voltages (e.g., 0.01-1.0 V), thereby enabling unprecedented low-power electronic detection using structurally well-defined MPc-based materials without the assistance of conductive binders.

Example 1.2. Results and Discussion

MOF Synthesis and Characterization.

Figure 3A:
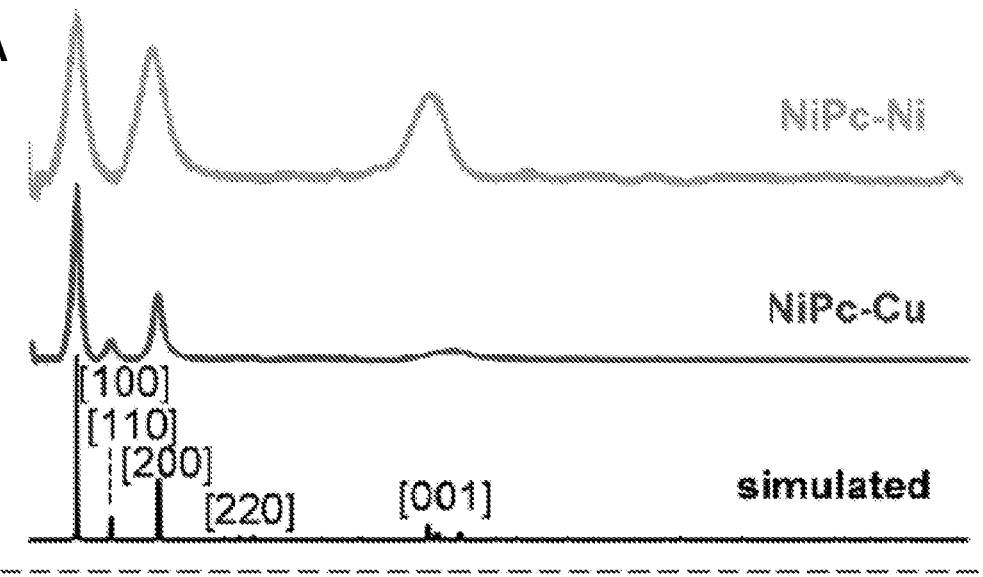
FIGS. 3A-B illustrate simulated and experimental powder X-ray diffraction (PXRD) patterns for NiPc-M, shown in FIG. 3A, and NiNPc-M, shown in FIG. 3B, MOFs with eclipsed packing modes.

Applicants used solvothermal synthesis to integrate nickel phthalocyanine (NiPc), and its π-extended derivative, nickel naphthalocyanine (NiNPc), into MOF structures through the self-assembly with two different metal centers (Ni, Cu) (FIGS. 2A-B). The formation of 2D mesh structures—NiPc-M and NiNPc-M (M=Ni, Cu)—was confirmed by powder X-ray diffraction (PXRD). The PXRD pattern of NiPc-Ni showed strong peaks at 2θ=5.1°, 10.0°, and 27.5° (FIG. 3A), assigned to [100], [200], and [001] facets, respectively.

Figure 3B:
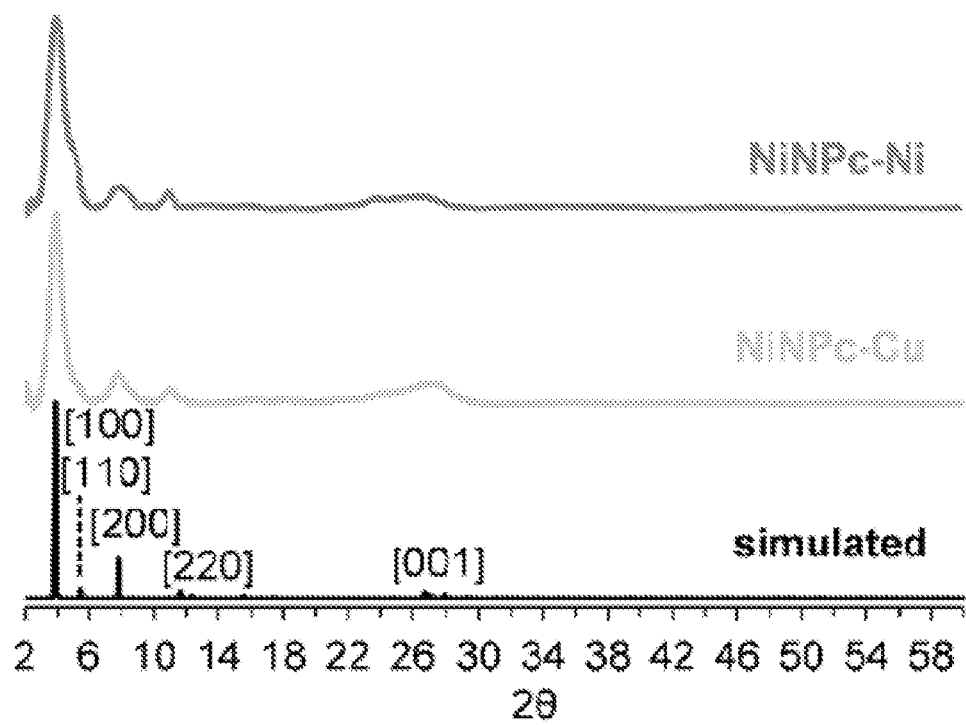
Figure 4A:
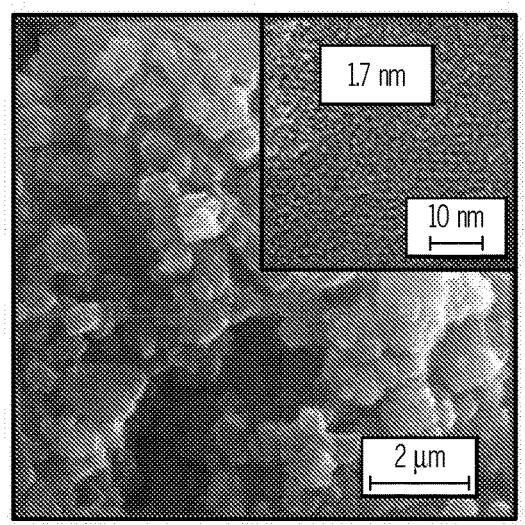
FIG. 4A illustrates a scanning electron micrograph (SEM) image for NiPc-Ni MOF. The inset is the corresponding transmission electron microscopy (TEM) image.
Figure 4B:
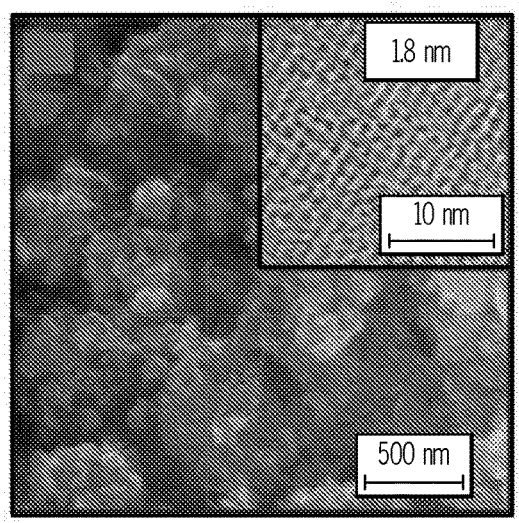
FIG. 4B illustrates an SEM image for NiPc-Cu MOF. The inset is the corresponding TEM image.
Figure 4C:
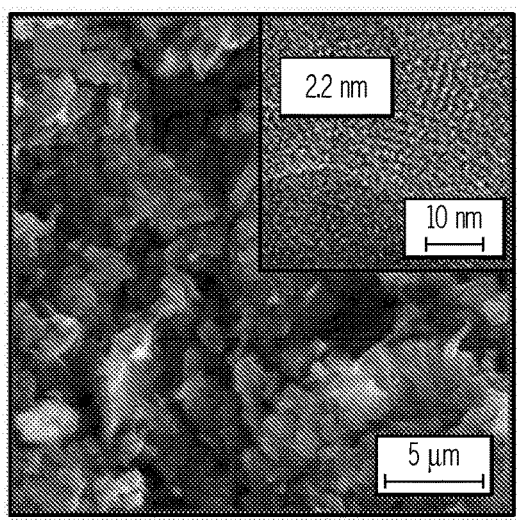
FIG. 4C illustrates an SEM images for NiNPc-Ni MOF. The inset is the corresponding TEM image.
Figure 4D:
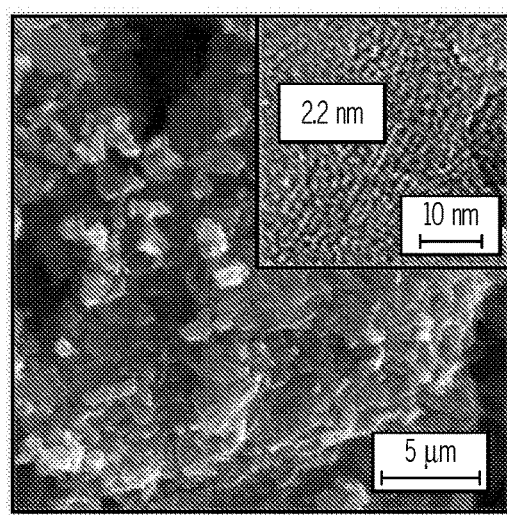
FIG. 4D illustrates an SEM images for NiNPc-Cu MOF. The inset is the corresponding TEM image.

NiPc-Cu presented sharp peaks at similar positions to NiPc-Ni, and showed additional peaks at 2θ=7.2° and 14.9°, ascribed to [110] and [220] facets, respectively. NiNPc-Ni and NiNPc-Cu showed analogous PXRD patterns to their NiPc analogs (FIG. 3B). Simulations using the P4/mmm space group with eclipsed cofacial AA-stacking mode of NiPc or NiNPc subunits in these MOFs were consistent with the experimental results (FIGS. 2A-B). The formation of the MOFs was further confirmed by attenuated total reflectance Fourier transform infrared spectroscopy and elemental analysis.

Scanning electron microscopy (SEM) revealed nanoscopic crystallites in all the four MOFs (FIG. 4A-FIG. 4D). High-resolution transmission electron microscopy (HR-TEM) provided direct visualization of square pores for NiPc-Cu and parallel lines with characteristic spacings for the other three MOFs (insets in FIG. 4A-FIG. 4D). X-ray photoelectron spectroscopy (XPS) showed that the ligand within NiPc-Ni MOF existed primarily in the semiquinone form, with metal nodes as $Ni^{2+}$, resulting in a charge neutral skeleton: [NiPc][Ni]$_2$. In contrast, the ligand in NiNPc-Ni exhibited a mixed state of semiquinone (sq) and quinone (q) forms, where residual charge of the MOF skeleton may be balanced by the acetate or hydroxide counterions. The high-resolution analysis of the Cu 2p peaks indicated that the Cu nodes in both NiPc-Cu and NiNPc-Cu mainly exist as $Cu^+$. This observation was consistent with the electron paramagnetic resonance (EPR) analysis, where NiPc-Cu and NiNPc-Cu showed only weak paramagnetism from $Cu^{2+}$. The ligands in NiPc-Cu and NiNPc-Cu were found to be in a mixed sq/q state by XPS, leading to charge neutral scaffolds.

The electrical conductivity of NiPc-M and NiNPc-M MOFs measured at room temperature on pressed pellets using a four-point probe method ranged between $10^{-4}$ and $10^{-2}$ S/cm. Density functional theory (DFT) calculations showed dispersed electronic band structures that cross the Fermi level for all MOFs used in this Example. Compared with the single molecule NiPc analogs, imbedding of the NiPc subunits into framework structures improved the conductivity of the material by 5-7 orders of magnitude. The conductivity values of these MOFs were within a similar range compared to metal-bis(dioxolene) (MBo)-linked MOFs, 2-4 orders higher than copper octahydroxyphthalocyanine MOF, and several orders lower than the MOF made from nickel octaaminophthalophthalocyanine and other metal-bis-(diimine)-linked MOFs. Gas adsorption analysis showed Brunauer-Emmett-Teller surface areas of 101-284 $m^2/g$.

Example 1.3. Chemiresistive Response of NiPc-M MOFs

To illustrate the chemiresistive gas sensing ability of the MOFs, Applicants focused on three representative analytes: $NH_3$, $H_2S$, and NO. These gases represent well-known toxic pollutants, and biological signaling molecules. Drop casting 10 μL of the MOF suspension (1-4 mg/mL in $H_2O$) onto interdigitated gold electrodes (5 μm gap) generated functional devices with resistances in ~kΩ range and film thicknesses of 1-6 μm.

Figure 5A:
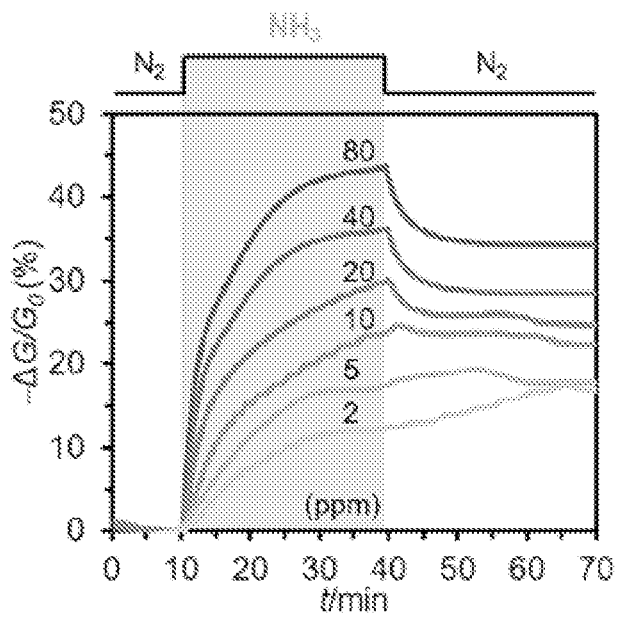
FIGS. 5A-F illustrate the performance of chemiresistive device of NiPc-M MOFs with FIGS. 5A-5C showing representative response of NiPc-Ni MOF to $NH_3$, $H_2S$, and NO at different concentrations, and FIGS. 5D-5F showing representative responses of NiPc-Cu MOF to $NH_3$, $H_2S$, and NO at different concentrations.
Figure 5B:
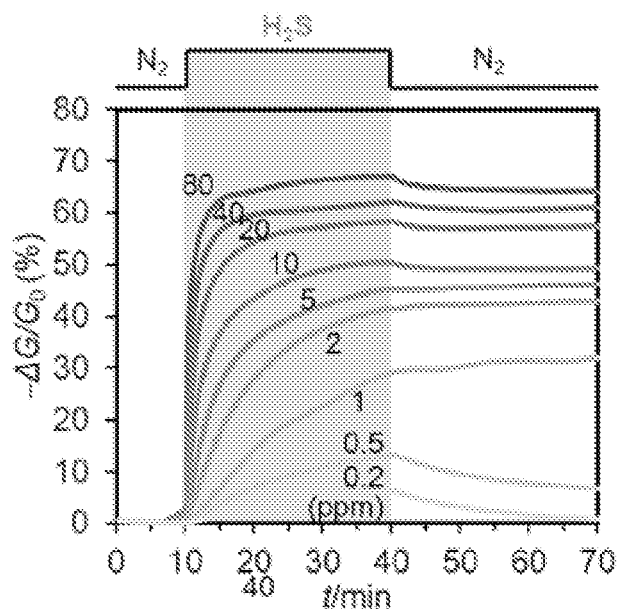
Figure 5C:
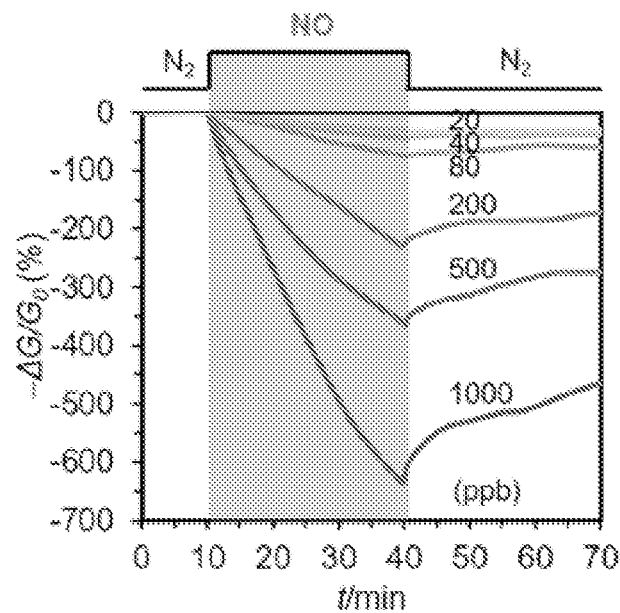
Figure 5D:
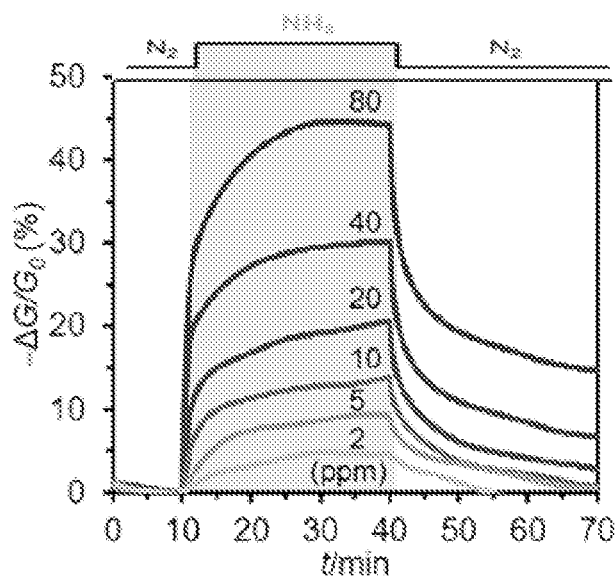
Figure 5E:
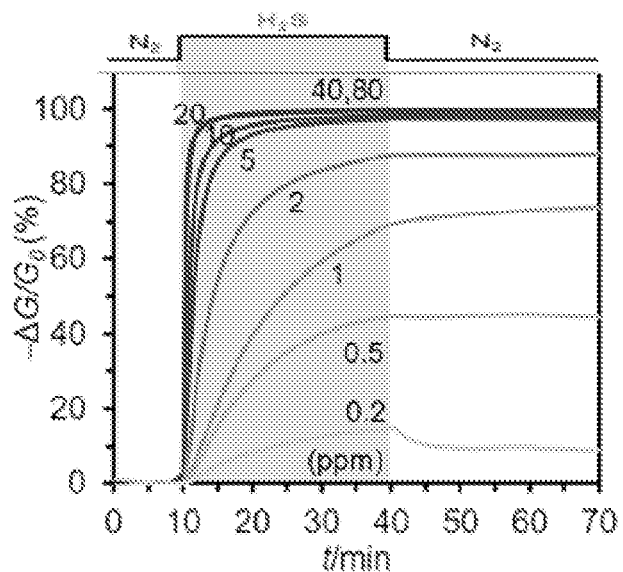

FIG. 5A and FIG. 5D illustrate normalized responses ($-\Delta G/G_0$) of the devices made from NiPc-Ni and NiPc-Cu during exposure to 2-80 ppm of $NH_3$ for 30 min. The positive changes in the response of NiPc-M MOFs toward $NH_3$ are consistent with p-type character of most materials having MPc subunits. The average response toward 80 ppm of $NH_3$ reached 43%-45% after 30 min exposure. NiPc-Ni showed partially reversible response to $NH_3$. The response of NiPc-Cu was quasi-reversible at $[NH_3]>20$ ppm, with full recovery at $[NH_3]\leq10$ ppm. NiPc-M MOFs showed faster and higher responses to $H_2S$ than to $NH_3$ (FIG. 5B and FIG. 5E).

Figure 5F:
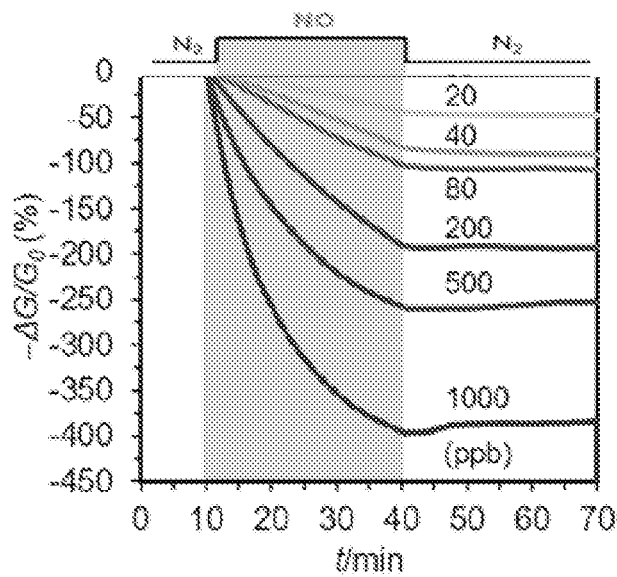

Saturation of response was achieved within 10 min of exposure to 80 ppm of $H_2S$, with response values of 64% and 98% for NiPc-Ni and NiPc-Cu, respectively. Above 90% saturation of response was achieved for NiPc-Ni and NiPc-Cu within only 2.3 and 1.3 min, respectively. Detection of $H_2S$ was dosimetric at $[H_2S]>1$ ppm with only partial recovery observed at concentrations below 0.5 ppm. In contrast to the positive responses to $NH_3$ and $H_2S$, both of NiPc-Ni and NiPc-Cu exhibited negative response upon exposure to NO, suggesting that NO acts as an electron acceptor in the interaction with these MOFs. NiPc-Ni and NiPc-Cu showed a remarkable response of −657% and −397%, respectively, after 30 min exposure to [NO]=1 ppm (FIG. 5C and FIG. 5F).

Example 1.4. Response Analysis and Determination of LOD

Figure 6A:
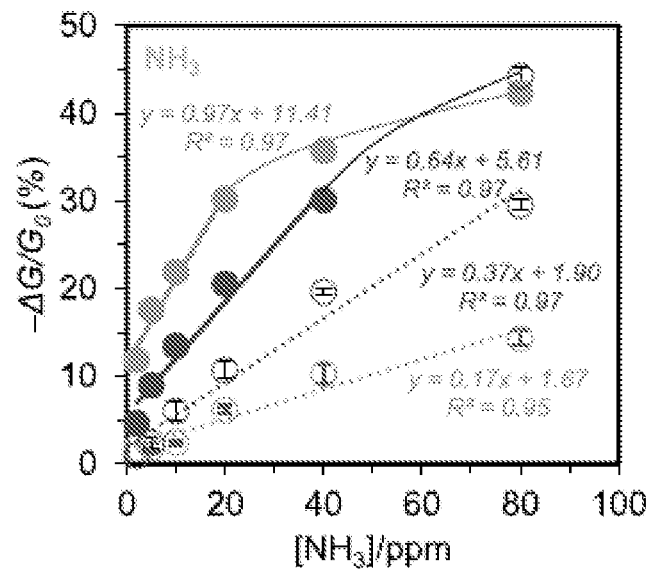
FIGS. 6A-6C illustrate the responses ($-\Delta G/G_0$) of NiPc-Ni (green) and NiPc-Cu (blue) after 1.5 min (hollow dots) and 30 min (filled dots) exposure versus concentration of $NH_3$, $H_2S$, and NO.

FIG. 6A shows the change in response of NiPc-M MOFs upon 1.5 and 30 min exposure toward $NH_3$ at different concentrations. Good linearities ($R^2=0.95$ and 0.97 for NiPC-Ni and NiPc-Cu, respectively) are observed from the responses generated upon 1.5 min $NH_3$ exposure at 2-80 ppm concentration range. For prolonged exposure time of 30 min, the linear ranges identified within the experimental concentration window slightly narrowed. The theoretical LODs calculated based on the response after 1.5 min exposure of $NH_3$ were 0.31 and 0.33 ppm for NiPc-Ni and NiPc-Cu (FIG. 6A), respectively, which fall among the lowest LOD values provided by other chemiresistive sensors based on conductive MOFs. Notably, chemiresistors made from NiPc-Cu, with their optimal conductance and good response reversibility toward $NH_3$, can operate successfully under sequential exposures to different concentrations of $NH_3$ with an applied voltage down to 0.01 V.

Figure 6B:
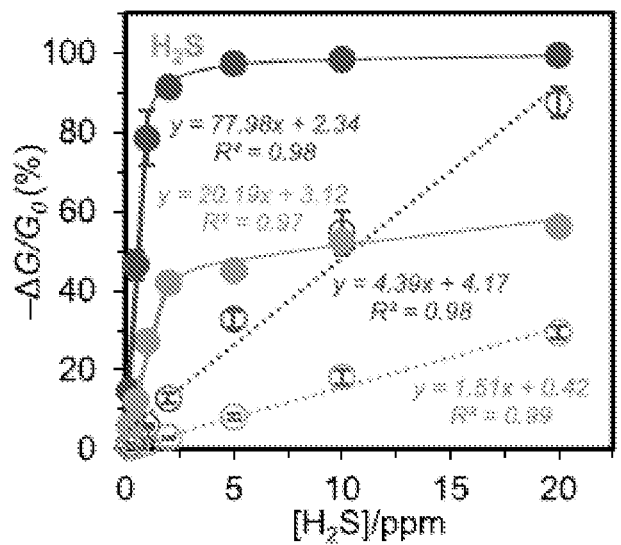

The NiPc-M devices exhibited good linear dependence of response $[H_2S]=0.2$-20 ppm after 1.5 min exposure (FIG. 6B). The LOD values derived from these linear relationships were 32 and 19 ppb for NiPc-Ni and NiPc-Cu, respectively. These LODs are 1 order of magnitude lower than LODs of e-textiles employing conductive MOFs and two orders lower than that of graphene/conductive polymer-based nanocomposites. Applicants observed strong dependence of the linear range on the time of exposure in $H_2S$ sensing. Upon 30 min of exposure, only the low concentrations were found to be within the linear range (0.2-2.0 ppm for NiPc-Ni and 0.2-1.0 ppm for NiPc-Cu), which may be due the fast saturation of the sensor response under high concentrations.

Figure 6C:
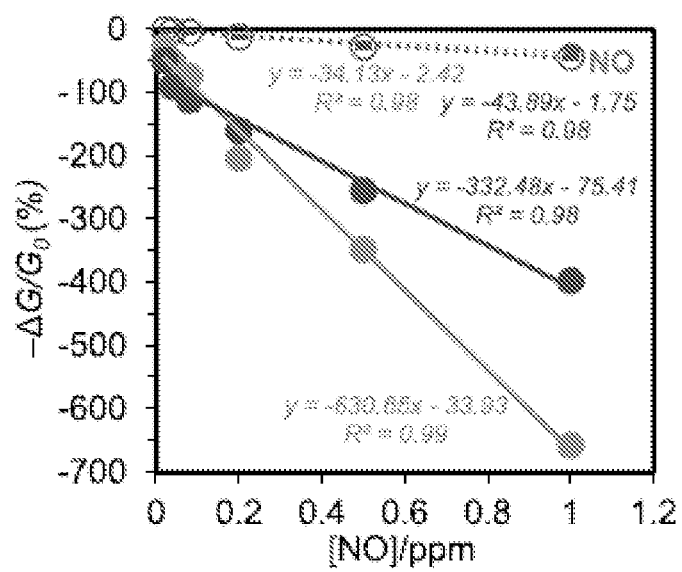

Applicants observed good linearity in response ($R^2=0.98$-0.99) to NO in the entire experimentally assessed concentration range of 0.02-1.0 ppm at different exposure times (FIG. 6C). The calculated LOD values were 1.0-1.1 ppb for 1.5 min exposures. Ultralow LOD values of 0.06-0.14 ppb can be derived based on response from 30 min exposures. These striking values significantly surpass the performance of sensors fabricated from metal oxides, transition metal dichalcogenide, conductive MOFs, and nanocomposites.

Figure 6D:
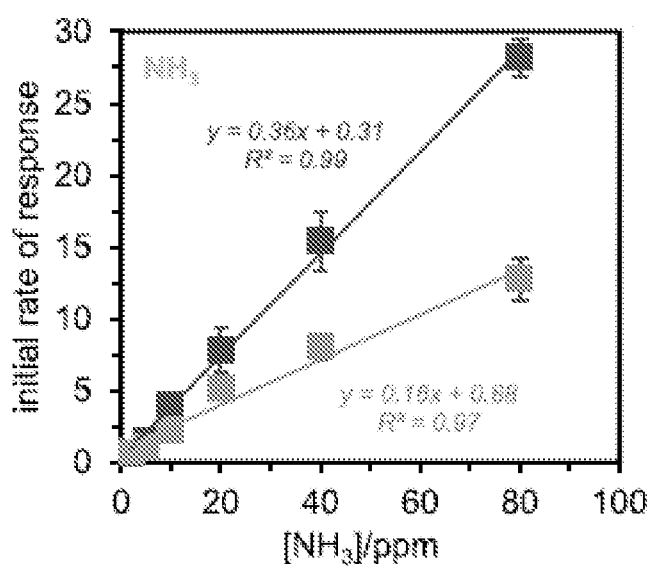
FIGS. 6D-6F illustrate the relationship between the rate of response $((-\Delta G/G_0)/\Delta t)$ and gas concentrations during the first 1 min of analyte exposure.
Figure 6E:
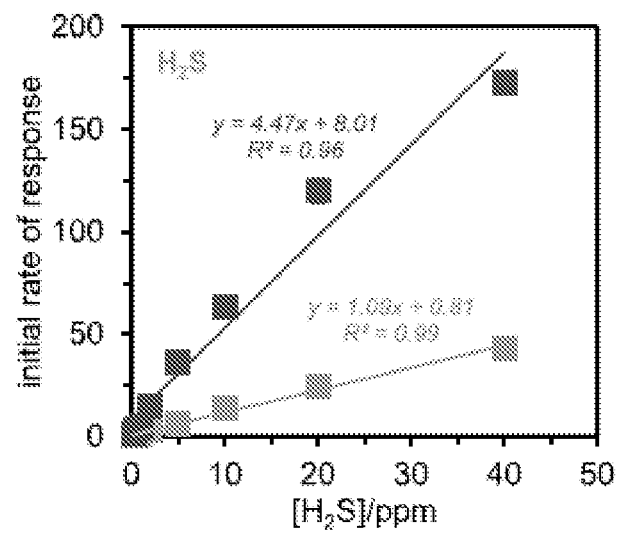
Figure 6F:
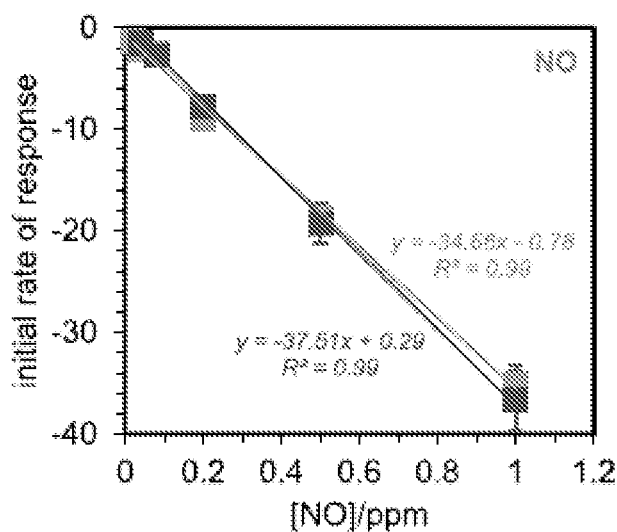

Based on the different sensing dynamics at different concentrations of analytes shown in FIGS. 5A-5F, a facile analysis of the concentration of three gaseous analytes can also be achieved through the analysis of initial rates of the response (FIG. 6D-FIG. 6F). To achieve this analysis, Applicants expanded on the region of the data in FIGS. 5A-5F during the first 1 min of exposure to each analyte, and generated a linear fit to the data to quantify the initial rate of response, $(-\Delta G/G_0)/\Delta t$, using the slope of the linear fit (FIG. 6D-FIG. 6F). Compared with the response-concentration fitting in FIG. 6A-FIG. 6C, wider linear ranges can be obtained for the initial rate of the response-concentration fitting for $NH_3$ and $H_2S$ for the concentrations examined in this Example. Both methods, the analysis of response and its initial rate, yielded analyte-specific concentration-dependent information.

Figure 7A:
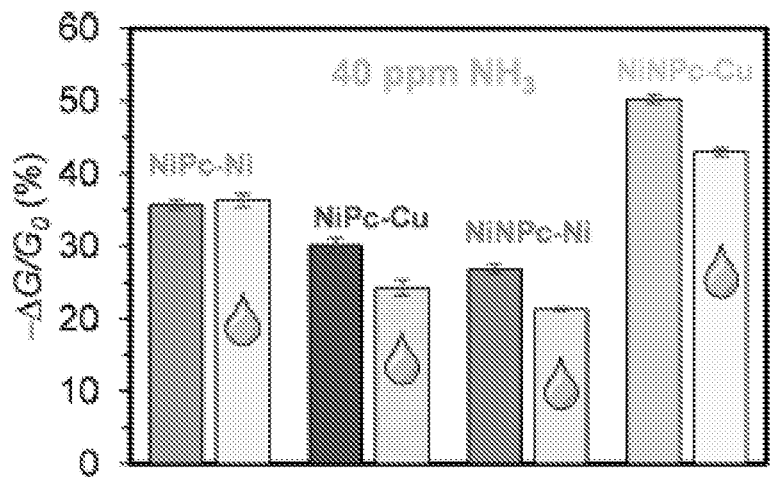
FIG. 7A illustrates sensing responses of NiPc-M and NiNPc-M MOFs upon 30 min exposure to 40 ppm of $NH_3$ in dry nitrogen (solid filled) and in the presence of 5000 ppm of $H_2O$ (pattern filled column with a droplet symbol).
Figure 7B:
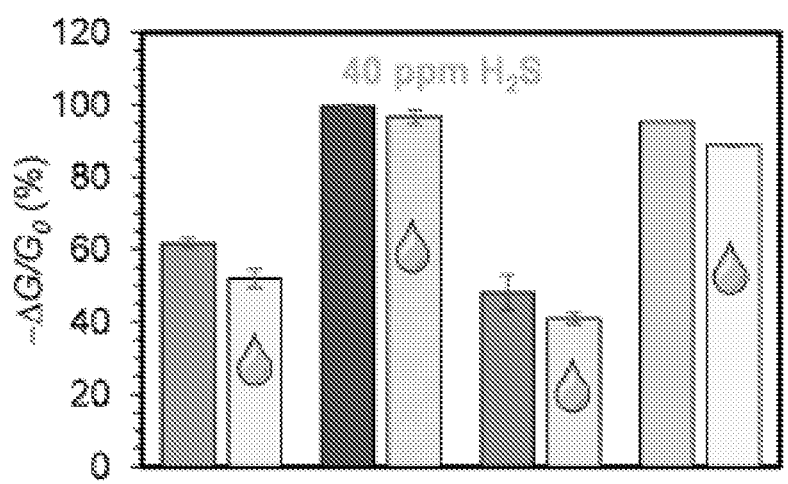
FIG. 7B illustrates sensing responses of NiPc-M and NiNPc-M MOFs upon 30 min exposure to 40 ppm of $H_2S$ in dry nitrogen (solid filled) and in the presence of 5000 ppm of $H_2O$ (pattern filled column with a droplet symbol).
Figures 7C, 7D:
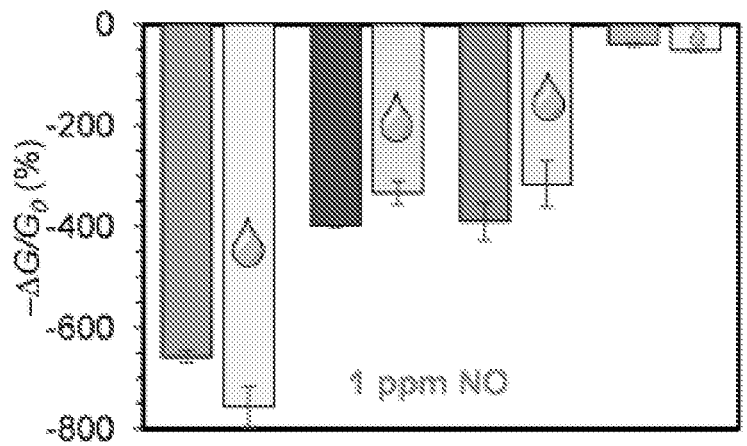
FIG. 7C illustrates sensing responses of NiPc-M and NiNPc-M MOFs upon 30 min exposure to 1 ppm of NO in dry nitrogen (solid filled) and in the presence of 5000 ppm of $H_2O$ (pattern filled column with a droplet symbol).
FIG. 7D illustrates principle component analysis (PCA) for arrays of NiPc-Ni (green), NiPc-Cu (blue), NiNPc-Ni (red) and NiNPc-Cu (yellow) sensors (each type of symbol represents single array), showing capability for differentiating $NH_3$, NO, and $H_2S$.

Example 1.5. Response in the Presence of $H_2O$ and Structure-Property Relationships As isoreticular analogues of NiPc-M, NiNPc-M MOFs exhibited good responses toward all the three gases under the same operating conditions (FIG. 7A-FIG. 7C). These devices showed good device-to-device reproducibility with average coefficients of variation <4%. Three notable trends emerged in FIG. 7A-FIG. 7C. First, the performance of all the devices was not significantly altered in humidified gas stream (18% relative humidity), where the concentration of $H_2O$ exceeded 100 times that of the analytes (pattern filled columns in FIG. 7A-FIG. 7C).

Second, all Cu-linked MOFs consistently gave higher responses to $H_2S$ (40 ppm) than Ni-linked MOFs (100% in NiPc-Cu vs 62% in NiPc-Ni, and 95% in NiNPc-Cu vs 48% in NiNPc-Ni, FIG. 7B). Conversely, Ni-linked MOFs responded stronger toward NO than Cu-linked analogs (FIG. 7C). Third, on average, NiPc-based MOFs exhibited higher responses to $H_2S$ and NO than their NiNPc counterparts (FIG. 7B and FIG. 7C).

NiPc-Ni and NiPc-Cu showed 28% and 5% higher responses to 40 ppm of $H_2S$ than their corresponding NiNPc analogues. The response produced by NiPc-Ni to 1 ppm of NO was 69% higher than that produced by NiNPc-Ni; meanwhile, the response produced by NiPc-Cu was 5.5 times higher to 1 ppm of NO than NiNPc-Cu (FIG. 7C). Taken together, these trends demonstrate that the identity of both the inorganic linkers and the MPc π-system determine the sensitivity and selectivity of response in MOFs. Principle component analysis (PCA) showed that all of the NiPc-M and NiNPc-M MOFs were able to differentiate $NH_3$ (40 ppm), $H_2S$ (40 ppm), and NO (1 ppm) (FIG. 7D).

Example 1.6. Sensing Mechanism

Applicants hypothesize that the chemiresistive sensing mechanism of the gaseous analytes by bimetallic 2D MPc-based MOFs may arise from (1) a surface interaction of the analyte molecules with the surface of the materials and (2) a charge-transfer or redox event occurring between the analyte and the sensing material, which may ultimately trigger a conductivity change. The potential existence of open coordination sites on the metal centers may act as active sites for analytes binding. The aqua ligands on the metal centers may also be involved in hydrogen bonding with the analytes. The presence of defects and dangling coordination sites on the edges of 2D sheets of the MOFs can also contribute.

To gain insight into the sensing mechanism, Applicants chose two spectroscopic techniques, XPS and EPR, capable of providing information regarding changes in chemical composition and associated redox events. Because of the dosimetric nature of the interaction of NiPc-M MOFs with $H_2S$ and NO, Applicants reasoned that these analytes may serve as permanent spectroscopic probes of the sensing mechanism without the assistance of in situ techniques. EPR analysis was carried out at 77 K under $N_2$ atmosphere after the bulk MOF sample (~2 mg) was exposed to 40 ppm of $H_2S$ or 1 ppm of NO for 30 min. XPS analysis was carried out on MOF samples using similar procedures of analyte exposure, which were subsequently mounted on copper tape and analyzed under reduced pressure ($<10^{-9}$ psi).

EPR showed that after the exposure of NiPc-M MOFs to $H_2S$, a typical electron donor, the content of C=O bonds decreased, indicating potential reduction of the organic portion of the MPc ligands in the NiPc-M MOFs. The interaction of $H_2S$ with NiPc-M MOFs also resulted in a detectable intensity decrease in their EPR signal at g=1.988 and 2.021 for NiPc-Ni and NiPc-Cu, respectively, indicating that the unpaired radical content of the materials may be perturbed by $H_2S$ exposure. On the contrary, after the exposure of NO, which can serve as an electron acceptor, the ligand in NiPc-Ni was oxidized, as evident from the increased content of C=O bonds. For the NiPc-Cu MOF, the oxidization of the metal centers from $Cu^+$ to $Cu^{2+}$ was also observed by both XPS and EPR. $Cu^{2+}$ peak was directly observed in XPS after exposure to NO; this spectral feature was absent in the pristine NiPc-Cu. The intensity of the EPR signal (g=2.021) from the Cu-centered radical increased, indicating that part of the EPR-silent $Cu^+$ in the pristine NiPc-Cu was oxidized to paramagnetic $Cu^{2+}$.

Example 1.7. Conclusion

Applicants describe ordered bimetallic NiPc- and NiNPc-based 2D conductive MOFs, which possess three innovative characteristics in the context of 2D multifunctional materials design in the context of chemical sensing. First, the isoreticular synthesis provides access to homogeneously distributed MPc units, and generates low-dimensional materials with optimal conductivities suitable for low-power chemiresistive sensing. Second, integration of these materials into chemiresistive sensors shows exceptional sensitivity to $H_2S$ and NO (up to 100% and −700% in response, respectively). These performance metrics enable the ability to detect and differentiate several gases with exceptional LODs for $NH_3$ (0.31-0.33 ppm), $H_2S$ (20-33 ppb), and NO (1.0-1.1 ppb) at room temperature, matching or surpassing the performance of many of other conductive materials, including metal-oxide semiconductors, conductive MOFs, metal dichalcogenides, and nanocomposites. Although these values still fall behind those provided by optical and gas chromatographic methods, the utilization of bimetallic conductive MOFs holds promise for the development of new portable, low-power, remotely operated electronic detection methods that offer compatibility with non-line-of-sight wireless data transduction protocols. Third, the isoreticular MOF analogs permit tunable structure-function relationships, highlighting the promising advantage of the modular chemistry of MOFs for realizing engineered function.

Technical optimization of factors associated with cross-reactivity, long-term sensor stability, operation in complex sensing environments, cost, and scale-up of sensor fabrication methods are also envisioned for the application of the MOF-based devices in the state-of-the-art sensing systems. Applicants postulate that the synthetic access and performance metrics of bimetallic conductive 2D phthalocyanine-based MOFs presented herein have great potential to enable the future development and fundamental investigation of MPc-based multifunctional systems.

Example 2. Bimetallic Two-Dimensional Metal-Organic Frameworks for Chemiresistive Detection of Carbon Monoxide and Nitric Oxide This Example relates to bimetallic two-dimensional (2D) metal-organic frameworks (MOFs) for chemiresistive detection of carbon monoxide and nitric oxide.

Example 2.1. Introduction

The current challenges of the industrialized and fossil-powered economy demand the design and synthesis of new materials for portable sensors of toxic gases, such as carbon monoxide and nitrogen oxides ($NO_x$). Produced from the incomplete combustion of petroleum-based fuels, NO and CO remain among the highest toxicological causes of death worldwide. While hazardous gas detectors based on metal oxide semiconductors, microelectro-mechanical systems, and mid-infrared spectroscopy techniques are currently available, there is a growing need for the intensive distribution of low-power, ultra-sensitive, rapid, and inexpensive devices that can detect toxic gases before exposures become fatal.

This Example focuses on the use of heterobimetallic 2D conductive MOFs with integrated metallophthalocyanine (MPc, M=Co and Ni) moieties into the plane of the framework to achieve reversible detection of CO and NO with sub-part-per-million limits of detection. Applicants reported a series of isorecticular nickel phthalocyanine based 2D MOFs as active materials for sensing with exceptional sensitivity (sub-parts-per-million to part-per-billion levels) for $NH_3$, $H_2S$, and NO. Applicants reasoned that using heterogenous and modular building blocks in the context of chemical sensing may give rise to highly responsive materials that are greater than the sum of their parts. In this Example, Applicants demonstrate that by exchanging the metal within the MPc unit, Applicants can enhance the sensitivity and selectivity of Pc-MOFs to specific toxic gases.

Example 2.2. Experimental Design

Applicants' experimental design (FIG. 8) uses direct, bottom-up self-assembly of MPc linkers with embedded first row transition metals linked with copper metal nodes. MPcs possess a planar, aromatic inner conjugation system and can be functionalized with various heteroatoms. The central metal cation is also interchangeable with over 60 different elements which Applicants predicted would further enhance the tunability of MPc based MOFs. While MPcs have been used extensively as active materials and dopants in electronic chemical sensors, Applicants reasoned that integrating MPc motifs directly into MOF systems not only provide connecting units for the metal center, but additional active sites for enhanced chemical sensing of target gaseous analytes.

The metal within the functionalized MPc-based linker was chosen to be first row transition metals nickel and cobalt, due to the high affinity of these metals for specific gas probes. It has been shown experimentally that the Ni and Co analogs of MOF-74 demonstrated a higher affinity for CO than the Zn analogue for $CO_2/CH_4/CO$ separation, potentially due to chemisorption-like interactions occurring with the CO arising from electronic deficiency in the metals. Cobalt has also been previously reported to have high coordination affinity to carbon monoxide.

A cobalt based porphyrin covalent-organic framework (COF) has been recently reported to have high catalytic efficiency for the conversion of $CO_2$ to CO. MPc based molecular sensing units, either applied as homogenous films or as functional surface selectors, have also been used as active sites for the selective sensing CO and NO. Researchers have modified the surfaces of single-walled carbon nanotubes with iron porphyrin units for the chemiresistive detection of CO using gate modulated redox state devices.

Thus, Applicants reasoned that Ni and Co metal centers within MPc linkers may act as active sites for gaseous analyte interactions and varying this molecular entity will allow Applicants to investigate the significance of the metal within the MPc MOFs on the sensing responses to toxic gases. Applicants chose copper as the connecting metal node due to the precedent of conductive properties present in MPc based MOFs using this linker.

Example 2.3. Results and Discussion

Figure 8:
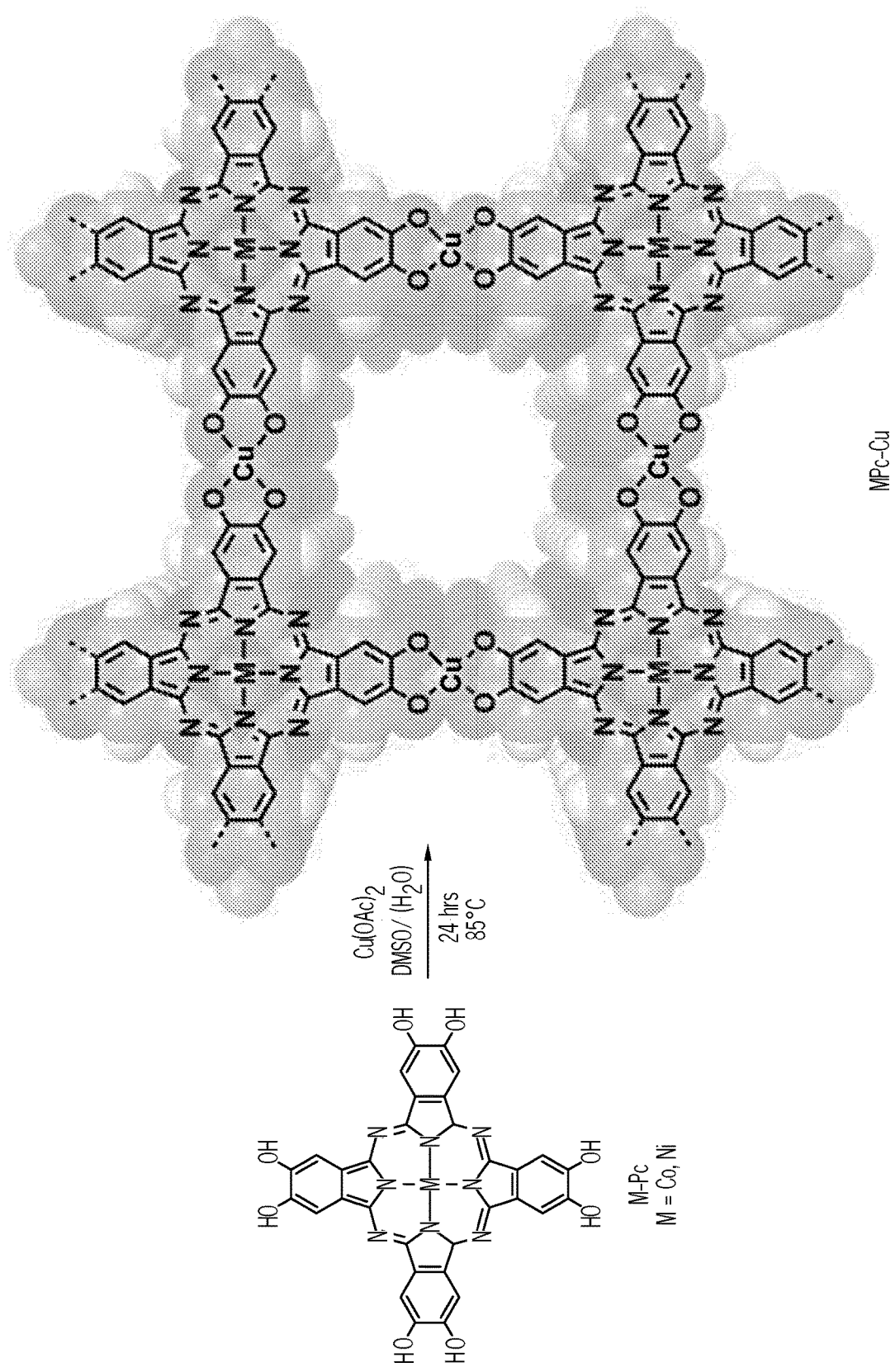
FIG. 8 illustrates a synthetic scheme for the fabrication of two-dimensional (2D) MPc-Cu MOFs according to an aspect of the present disclosure.

FIG. 8 demonstrates the chemical structures and synthetic conditions of MPc-Cu MOFs (M=Co or Ni). The MPc linkers were synthesized according to previously reported procedures, beginning with the dibromination of veratrole, followed by a palladium catalyzed cyanization reaction to yield 4,5-dimethoxyphthalonitrile. The cyclization of dimethoxyphthalonitrile uses a molybdenum and urea catalyst with the central metal ($CoCl_2$ or $NiCl_2$) at high temperatures (180° C.) in ethylene glycol to yield 2,3,9,10,16,17,23,24-octamethoxy-metallophthalocyanine (M=Co or Ni). The final step of the ligand synthesis converts the eight methoxy groups to hydroxy using boron tribromide (40 eq.) for one week in dichloromethane at room temperature to yield the linker 2,3,9,10,16,17,23,24-octahydroxy-metallophthalocyanine. Both MPc ligands were characterized by matrix-assisted laser desorption/ionization time-of-flight analysis (MALDI-TOF), attenuated total reflectance Fourier transform infrared spectroscopy (ATR-FTIR), and elemental analysis. Only NiPc was characterized by $H^1$NMR due to the paramagnetism of Co(II).

The solvothermal synthesis of the NiPc-Cu MOF was carried out in a 10-mL scintillation vial using dimethyl sulfoxide (DMSO) solvent with $Cu(OAc)_2$ at 85° C. for 24 hours to generate dark blue/black powders. The CoPc-Cu MOF used a $DMSO/H_2O$ solvent mixture and displayed good batch-to batch reproducibility.

Figure 9A:
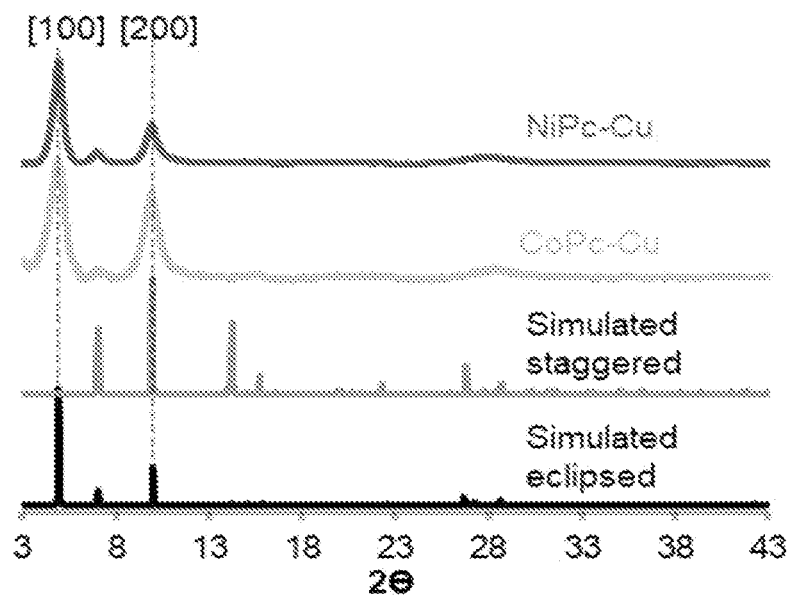
FIG. 9A illustrates PXRD diffraction patterns of NiPc-Cu (blue) and CoPc-Cu (green) MOFs.
Figure 9B:
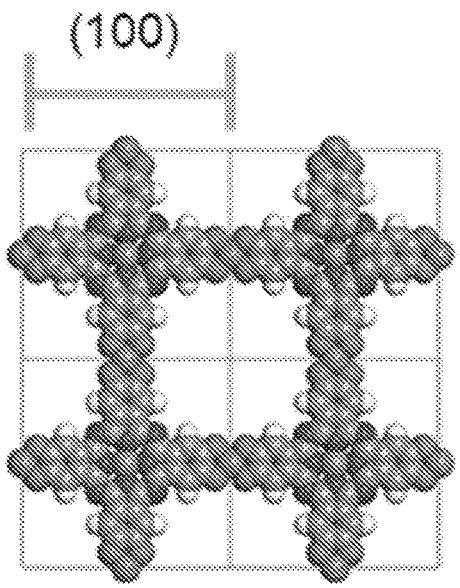
FIG. 9B illustrates simulated eclipsed stacking modes of MPc-M based MOFs.
Figure 9B:
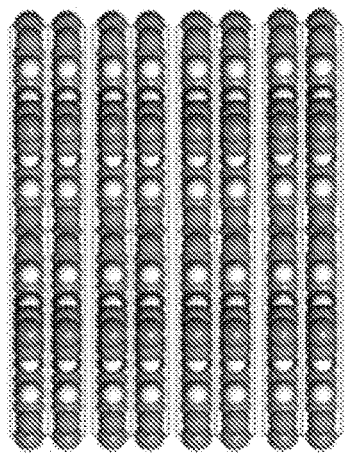
Figure 9C:
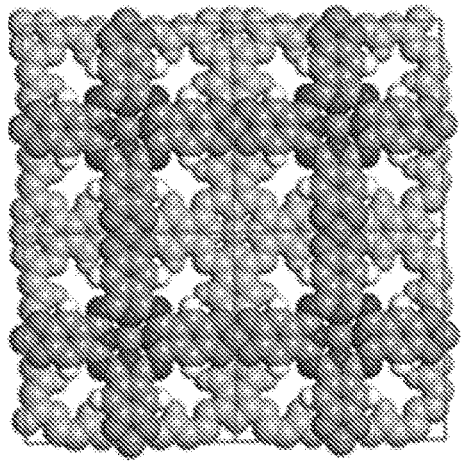
FIG. 9C illustrates simulated staggered stacking modes of MPc-M based MOFs.
Figure 9C:
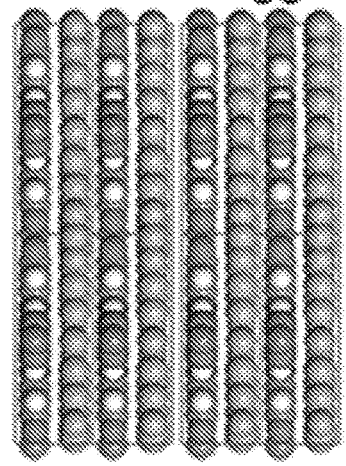

The structures of the MPc-Cu MOFs (M=Ni, Co) were confirmed by powder X-ray diffraction (PXRD) (FIGS. 9A-9C) and consistent with simulated eclipsed cofacial AA-stacking modes. The 2θ peaks occurring at 5.1°, 10.0° and 27.5° corresponded to the [100], [200] and [001] planes, respectively. The plane is corresponds to a distance of 1.73 nm while the [001] plane parallels the π-π stacking distance of 0.32 nm, comparable to the previously reported isoreticular CuPc-Cu and NiPc-Cu MOFs. The final structures encompass a grid-like lattice with 1.8 nm sized square pores that contain diverse surface and pore functionalities, unalike the Kagome honeycomb lattice previously used for chemiresistive sensing.

ATR-IR spectroscopy of the CoPc-Cu MOF showed the attenuation of the peak at 629 $cm^{-1}$, which has previously been assigned to C—O—H bending vibration of the uncoordinated catechol units. The IR spectra of CoPc-Cu also indicated the shift of the peak at 1270 $cm^{-1}$, which is allocated to the catechol C—O stretching vibration after chelating in η2 mode with copper. IR spectroscopy of the NiPc-Cu MOF also showed the slight shifting of the C—O—H frequency at 600 $cm^{-1}$ and of the C—O stretch of the catechol at 1282 $cm^{-1}$. The X-ray photoelectron spectroscopy (XPS) survey spectrum of CoPc-Cu MOF revealed the presence of C, O, N, Co and Cu. A detailed deconvoluted spectrum indicated the presence of mixed valency of $Cu^+$ and $Cu^{2+}$ in a 1:1 ratio. High-resolution analysis of the O 1s region showed the presence of two oxygen environments (C═O and C—O) in a 3:2 ratio, indicating a −3 charge on the Pc ligand (sq, sq, sq, q) (sq=semiquinone and q=quinone). In view of the chemical formula of the MOF ([CoPc][Cu]$_2$) and the presence of mixed valency of $Cu^+$/$Cu^{2+}$ in a 1:1 ratio, this analysis suggests that the framework is charge neutral.

High resolution XPS analysis also revealed two peaks at 796 eV and 781 eV which correspond to the Co2p region and indicate the presence of Co(II). Electron paramagnetic resonance (EPR) spectroscopy supported the presence of Co(II) along with the presence of a ligand centered radical for the CoPc ligand. EPR of the MPc-MOF revealed the presence of paramagnetic Co(II) or Cu(II) and possibly the presence of an $O_2$ adduct. The XPS and EPR spectrum of NiPc-Cu MOF matched previously reported characterization.

Figure 10:
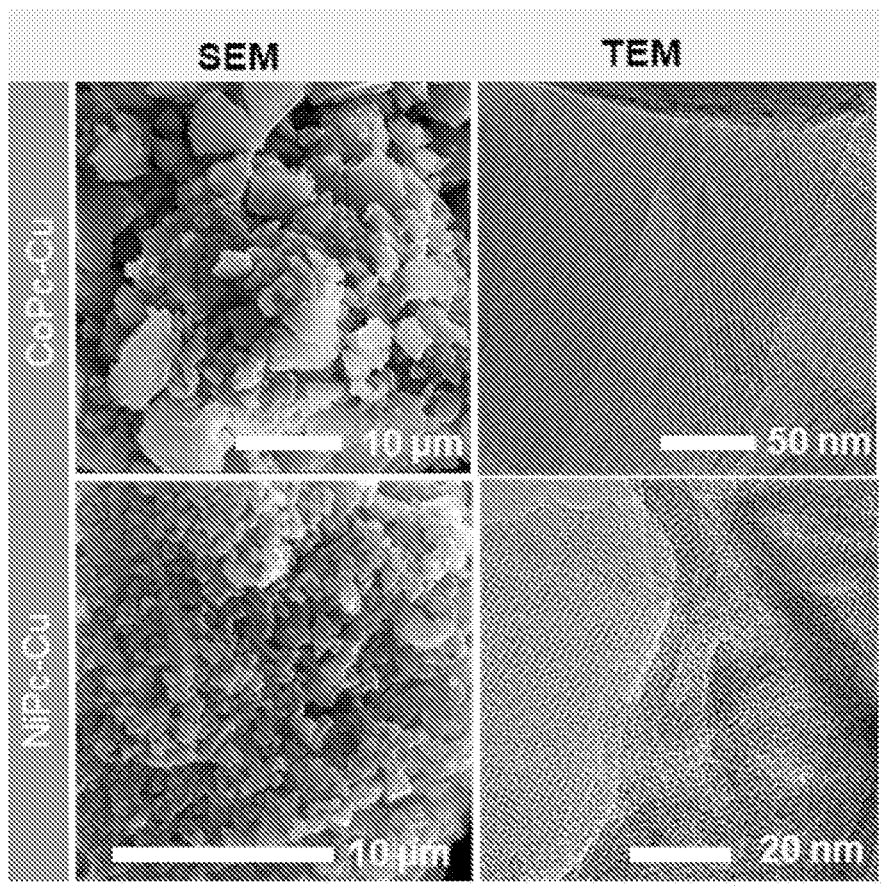
FIG. 10 illustrates SEM and transmission electron micrographs (TEM) images of MPc-based Cu-linked MOFs. Top Left: CoPc-Cu (SEM); Top Right: CoPc-Cu (TEM); Bottom Left: NiPc-Cu (SEM); Bottom Right: NiPc-Cu MOF (TEM).
Figure 11A:
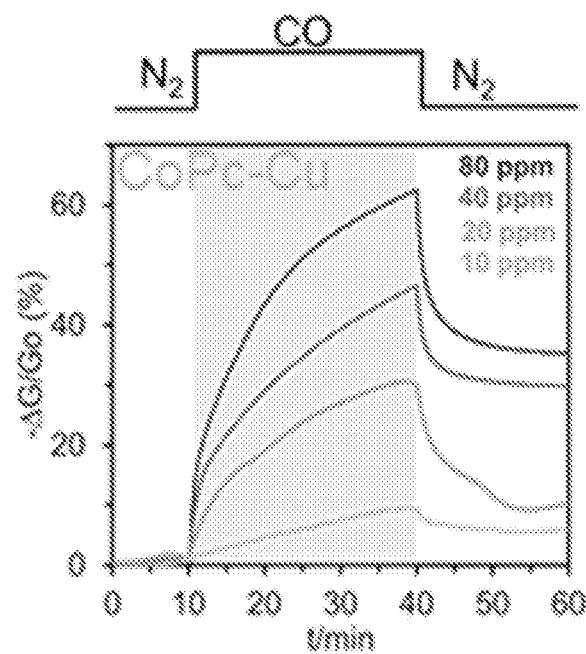
FIG. 11A illustrates saturation sensing traces after 30-minute exposure to 80, 40, 20 and 10 ppm of CO using CoPc-Cu MOF. The three devices with CoPc-Cu MOF were equilibrated with $N_2$ for 30 minutes before exposure to CO, and then equilibrated again with $N_2$ for one hour of recovery.
Figure 11B:
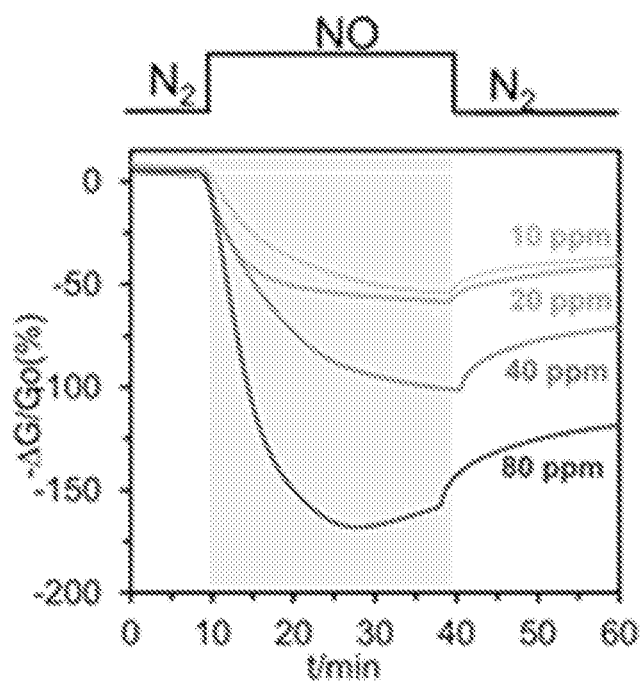
FIG. 11B illustrates 30-minute exposure to 80, 40, 20 and 10 ppm of NO using CoPc-Cu MOF.
Figure 11C:
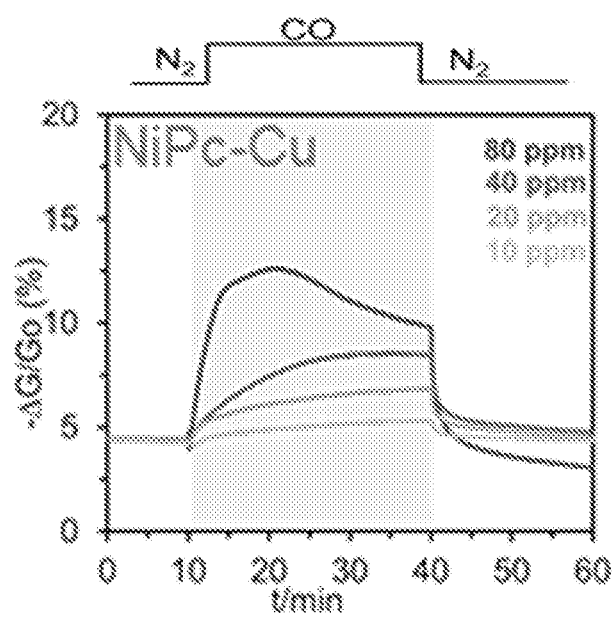
FIG. 11C illustrates saturation sensing traces after exposure to 80, 40, 20 and 10 ppm of CO using NiPc-Cu MOF.
Figure 11D:
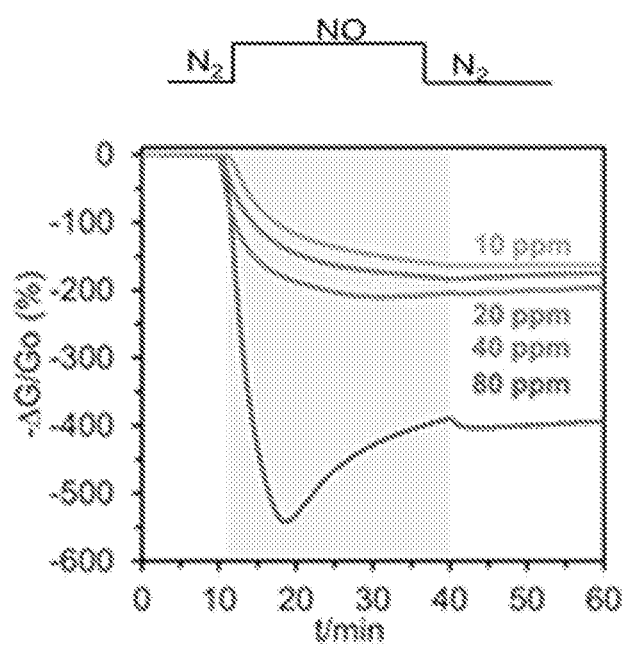
FIG. 11D illustrates saturation sensing traces after exposure to 80, 40, 20 and 10 ppm of NO using NiPc-Cu MOF.
Figure 11E:
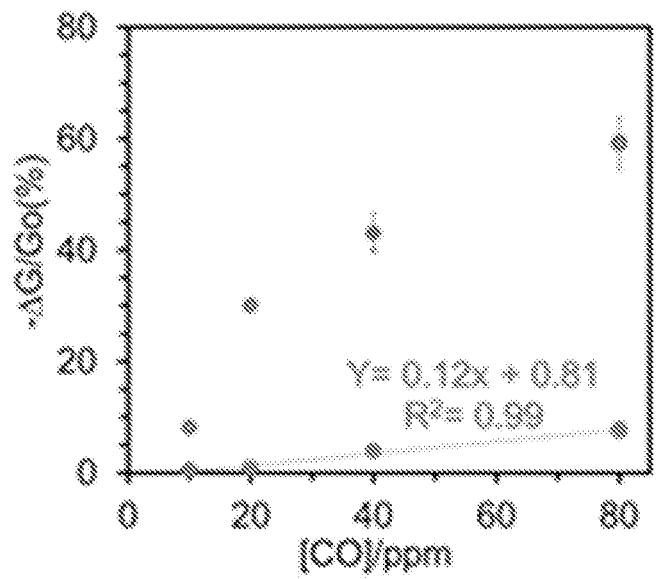
FIG. 11E illustrates total percent normalized change in conductance with respect to concentration of CO using CoPc-Cu (blue) and NiPc-Cu (red).
Figure 11F:
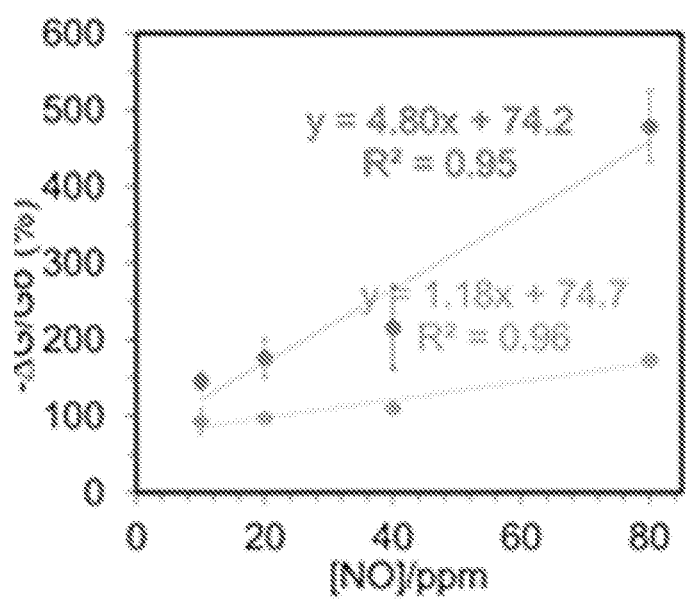
FIG. 11F illustrates total percent normalized change in conductance with respect to concentration of NO using CoPc-Cu (blue) and NiPc-Cu (red).

Scanning electron microscope (SEM) images revealed nanometer-sized square shaped crystallites in both CoPc and NiPc-Cu MOFs (FIG. 10). The sheet like layers were observed at higher magnification using high resolution transmission electron microscopy (TEM). The CoPc-Cu MOF displayed the presence of lattice lines spaced 3.3 nm (FIG. 10) while NiPc-Cu provided direct visualization of the square shaped pores within the lattice.

The electrical conductivity of CoPc-Cu measured at room temperature on a pressed pellet using the four-point probe method was determined to be $3.4 \times 10^{-3}$ S/cm, which is similar to previously reported MPc based MOFs.

Example 2.4. Fabrication of Chemiresistive Devices

To examine the chemiresistive gas sensing properties of both CoPc and NiPc-Cu MOFs, Applicants first suspended 1-3 mg of MOF powder in 1 mL of deionized water and sonicated the suspension for at least 1 hour. The black/dark grey suspension was drop casted (10 μL) onto 5 μm-spaced interdigitated gold electrodes (functional device yield was typically 75%). NiPc-Cu MOFs generated devices with 20-50 kΩ resistance while CoPc-Cu MOFs were measured in the 10-30 MΩ resistance range. Once prepared, the devices were enclosed in a custom-made Teflon chamber and successively exposed to carbon monoxide or nitric oxide (FIGS. 11A-F) using $N_2$ as the carrier gas. The devices were then allowed to recover by exposure to 0.5 mL/min of $N_2$.

Mass flow controllers were used to keep a constant flow rate and introduce either diluted CO/NO or inert $N_2$ into the chamber, which held the devices connected to the potentiostat. The potentiostat was held at a potential of 1.0 V and recorded data points at 0.5 second intervals. The initial current was divided by the current change after exposure to give the normalized change in conductance ($-\Delta G/G_0$) across all devices.

Example 2.5. Chemiresistive Responses of MPc-Cu MOFs to CO and NO

The responses of MPc-Cu MOFs to CO and NO gas as a function of concentration are summarized in FIG. 11A-FIG. 11D. FIGS. 11A-F demonstrate exposure of NiPc-Cu and CoPc-Cu to CO and NO for a saturation period of 30 minutes to four concentrations (80-10 ppm) with a 40-minute period of recovery using $N_2$. CoPc-Cu MOF materials demonstrate higher responses relative to NiPc-Cu MOF and good reversibility at low concentrations. CoPc-Cu has an average response reaching 59.2% to 80 ppm of CO, while NiPc-Cu demonstrated an average response of 7.6% to the same concentration with a change in current direction after exposure to higher concentrations.

This change in current during gas exposure may be due to the presence of two distinct active sites on the surface of NiPc-Cu, where after saturation of preliminary binding sites with higher binding affinity to CO, interaction with the second active site caused the change in current direction seen in NiPc MOF's. Conversely, NiPc-Cu presented higher responses to NO (FIG. 11D), reaching 479% in response after 18 minutes of exposure to 80 ppm, matching well with previously reported values for this material to NO. The NiPc-Cu presents higher sensitivity at lower concentrations (FIG. 11F) to NO, and again switches direction in current after saturation.

The calculated limit of detection (LOD) values derived from the linear relationships of concentration versus response (FIG. 11E and FIG. 11F) of CoPc-Cu were calculated as 9.1 ppm for CO and 5.7 ppm for NO, below Occupational Health and Safety Administration's required permissible exposure limits (PELs) of 25 ppm. The LOD value for NiPc-Cu to CO was calculated to be 12.5 ppm. During analysis of the initial rates of response where a linear fit is generated for the data during the first minute of exposure, a technique that may be valuable in determining the concentration of an analyte when assuming a pseudo-first order reaction, Applicants observed good linearity of responses at low concentrations.

Figure 12A:
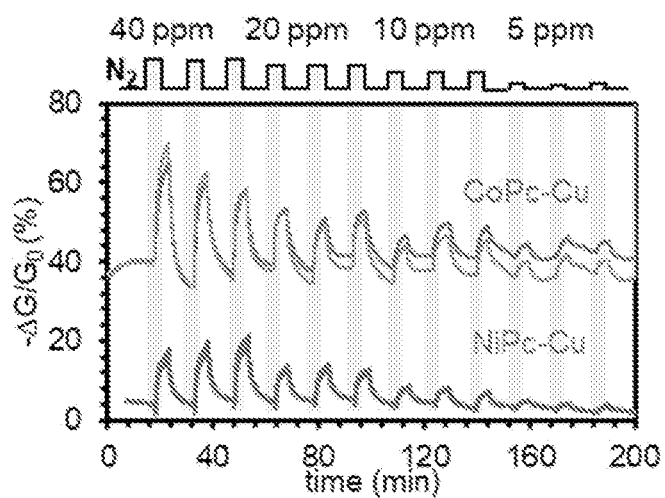
FIG. 12A illustrates sensing traces after 5-minute exposure to 40, 20, 10 and 5 ppm to CO and 10-minute recovery period with CoPc-Cu (orange) and NiPc-Cu (blue).
Figure 12B:
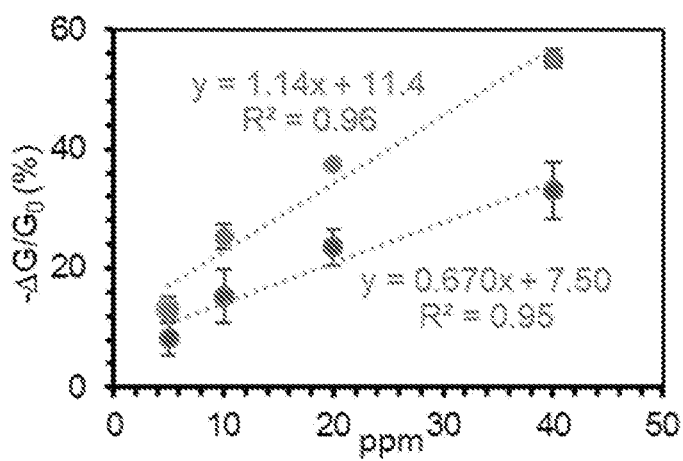
FIG. 12B illustrates a plot of concentration versus response of CoPc-Cu (orange) and NiPc-Cu (blue).

Both materials demonstrated positive changes in current to CO, a reducing gas and negative responses to NO, an oxidizing gas, which is characteristic of p-type electronic behavior of MPc-based materials. FIGS. 12A-12B examine the recoverability of each device to four sequentially exposed concentrations of 40, 20, 10 and 5 ppm. NiPc-Cu shows optimal reversibility to CO at these concentrations while CoPc-Cu demonstrates dosimetric responses after longer exposure times.

Example 2.6. Conclusion

In summary, Applicants have constructed a chemiresistor from 2D MPc based MOFs that are capable of real-time analysis and reversible detection of carbon monoxide. To the best of Applicants' knowledge, this is the first demonstration of carbon monoxide detection using MOF based chemiresistors. Applicants demonstrate that the identity of the central metal within the MPc unit has a significant influence on the sensing response of the MPc-Cu based MOFs, where the newly reported CoPc-Cu MOF displays higher sensitivity and rate of response to CO gas (60% response), while NiPc-Cu demonstrates this type of behavior toward NO (over 400% response). This Example demonstrates detecting carbon monoxide and nitric oxide using an MPc-based MOF design, with the normalized changes in conductance that surpass reported single walled carbon nanotubes, metal oxide sensors or rival recently reported colorimetric sensors. With optimization, these materials have potential to offer modular design strategies for sensitive and selective chemiresistive materials that operate over a broad dynamic range of concentrations.

Example 3. Octaamino Phthalocyanine (Pc) Ligands and Metal-Organic Frameworks (MOFs)

This Example describes synthesis and characterizations of octaamino phthalocyanine (Pc) ligands and metal-organic frameworks.

Example 3.1. Synthesis of 2,3,9,10,16,17,23,24-Octaamino Metallophthalocyanines Scheme 1

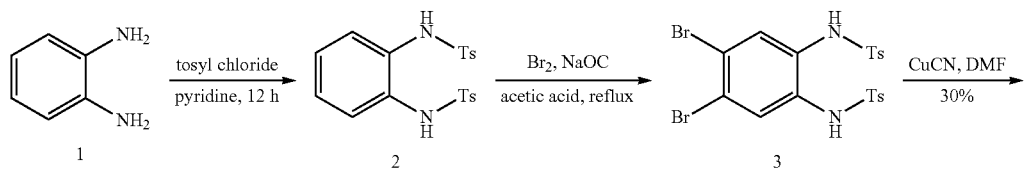

-continued
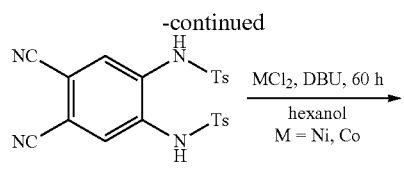
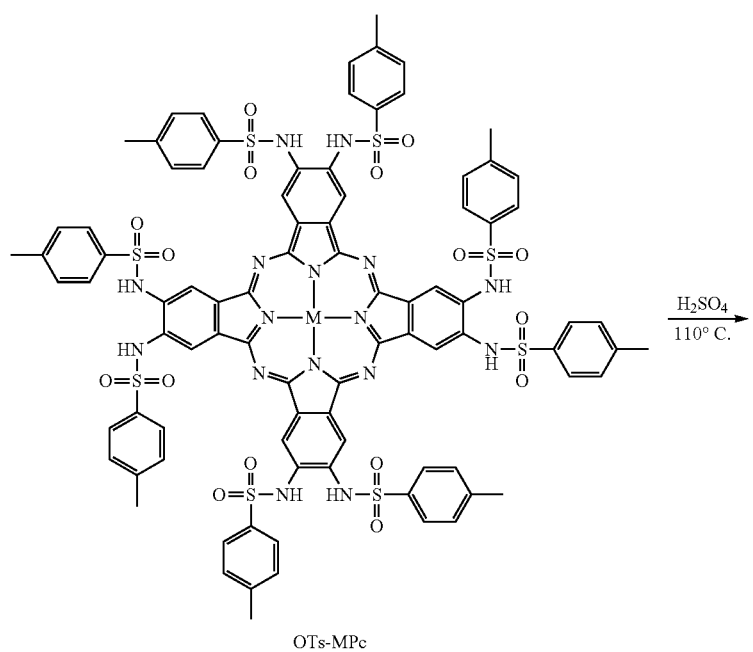
OTs-MPc
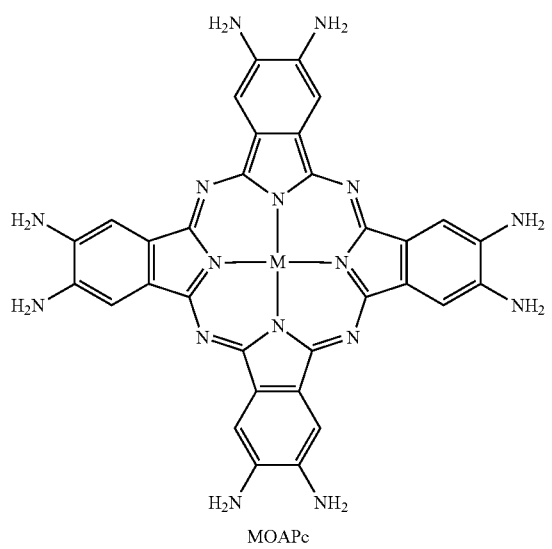
MOAPc

Synthesis of N,N'-(4,5-dicyano-1,2-phenylene)bis(4-methylbenzenesulfonamide) 4: The starting material N,N'-(4,5-dibromo-1,2-phenylene)bis(4-methylbenzenesulfonamide) 3, as shown in the above synthetic Scheme 1, was synthesized from o-phylenediamine 1 in two steps using literature procedures. The synthetic and work-up procedures for N,N'-(4,5-dicyano-1,2-phenylene)bis(4-methylbenzenesulfonamide) 4 were modified from the previously reported procedures. A mixture of 50 g (87.1 mmol) of N,N'-(4,5-dibromo-1,2-phenylene)bis(4-methylbenzenesulfonamide), 23.5 g (262.5 mmol, 3 e.q.) of CuCN and 240 mL of anhydrous DMF were heated to 120° C. for 48 h under $N_2$ atmosphere.

After the reaction was cooled to room temperature, the resulting dark brown mixture was mixed with aqueous $NH_3 \cdot H_2O$ (25%-28%, 600 mL) and air was bubbled through the solution for 24 h. A brown precipitate was collected by filtration and washed with water until the filtrate became colorless. The light green-yellow solid was dried and then dispersed into a mixture of dichloromethane (1 L) and acetic acid (100 mL). The mixture was extracted by EDTA·2Na aqueous solution (8 g in 300 mL $H_2O$) for 2 times to remove $Cu^{2+}$ residues. The aqueous phase was separated and further extracted with 500 mL of dichloromethane. The organic phase was combined and filtered through a fine fritted funnel to obtain a transparent and slightly brown solution. This organic solution was collected and evaporated to give a light yellow solid. The solid obtained was recrystallized from 300 mL of acetic acid to give yellows crystals, which were collected by filtration. These yellow crystals were further recrystallized from 200 mL of ethanol to improve the purity and give the desired product 4 as light yellow crystals (28 g, yield 69%). $^1$H NMR (600 MHz, 298K, DMSO-$d_6$) δ=7.67 (d, J=8.3 Hz, 2H), 7.58 (s, 1H), 7.36 (d, J=8.1 Hz, 2H), 2.37 (s, 4H). $^{13}$C NMR (600 MHz, 298K, DMSO-$d_6$) δ=144.5, 136.5, 134.4, 130.4, 127.3, 124.3, 116.1, 109.6, 21.5. The characterization data match the literature.

Figure 13:
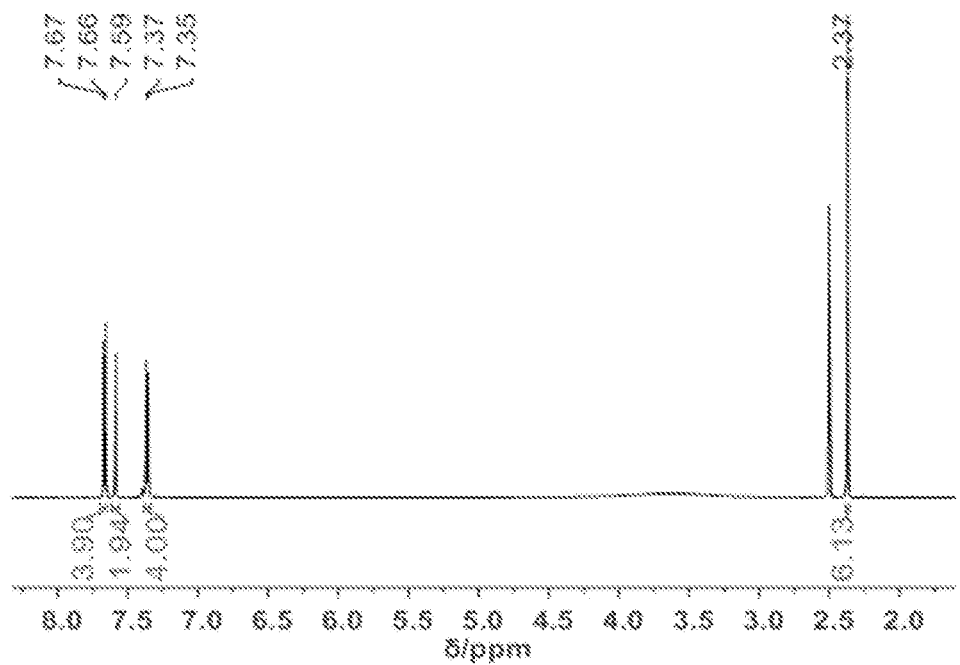
FIG. 13 illustrates $^1$H nuclear magnetic resonance (NMR) (600 M, 298 K, deuterochloroform ($CDCl_3$)) spectrum of N,N'-(4,5-dicyano-1,2-phenylene)bis(4-methylbenzenesulfonamide).
Figure 14:
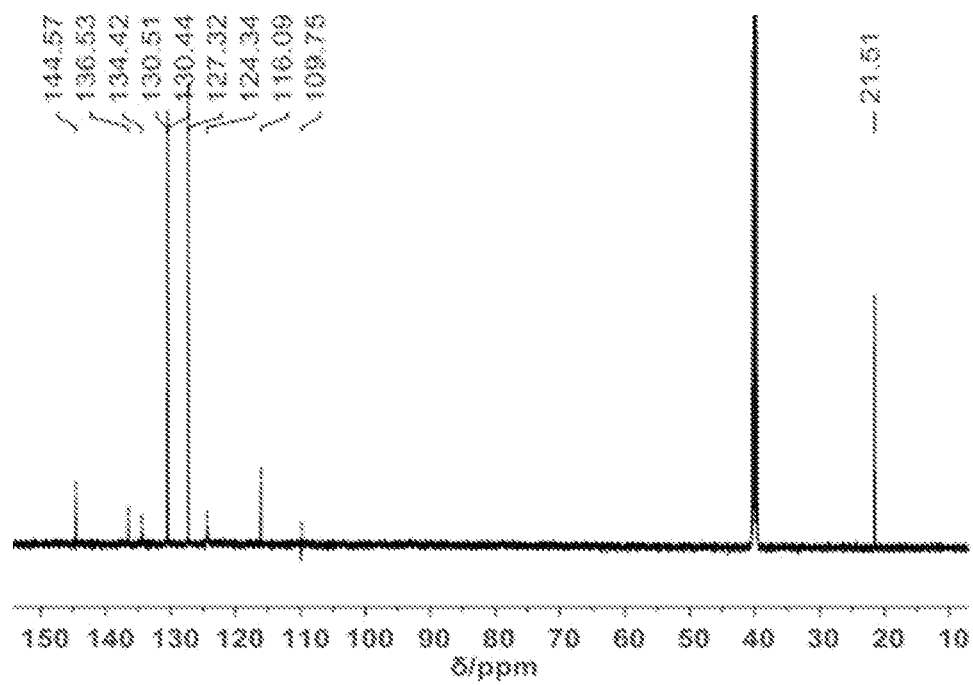
FIG. 14 illustrates $^{13}$C NMR (150 M, 298 K, $CDCl_3$) spectrum of N,N'-(4,5-dicyano-1,2-phenylene)bis(4-methylbenzenesulfonamide).

FIG. 13 illustrates $^1$H NMR (600 M, 298 K, CDCl$_3$) spectrum of 4, while FIG. 14 illustrates $^{13}$C NMR (150 M, 298 K, CDCl$_3$) spectrum of 4.

Synthesis of 2,3,9,10,16,17,23,24-octatosylaminophthalocyanine Ni(II) (OTs-NiPc): The synthesis of the 2,3,9,10,16,17,23,24-octatosylaminophthalocyanine Ni(II) was adapted from the literature. To a suspension of 4.01 g (8.6 mmol) of N,N'-(4,5-dicyano-1,2-phenylene)bis(4-methylbenzenesulfonamide) and 1.12 g of anhydrous NiCl$_2$ (8.6 mol, 1.0 eq) in n-hexanol (12 mL) in a glass pressure vessel, 2 mL of DBU (1,8-Diazabicyclo[5.4.0]undec-7-ene) was added. The system was purged with $N_2$ for 10 minutes and then sealed. The reaction vessel was then heated at 160° C. under $N_2$ for 36 hours. Upon cooling to room temperature, the reaction mixture was dissolved in 250 mL mixed solvent of acetic acid and CH$_2$Cl$_2$ (v/v=1:5). The organic extract was washed with water (200 mL×3) and then evaporated to dryness to generate an emerald-colored solid. The residual high boiling point hexanol remaining in the solid was removed by repeatedly dispersing the solid in 40 mL of CH$_2$Cl$_2$/petroleum ether mixture (v/v=1:3) and decanting the brownish solvent. The emerald-colored crude product was further purified by column chromatography (silica gel, eluent: CH$_2$Cl$_2$/MeOH=50/1) to give OTs-NiPc as a green solid (1.27 g, yield 67%). $^1$H NMR (600 MHz, 298K, CDCl$_3$) δ=8.79 (s, 4H), 8.64 (s, 4H), 8.03 (s, 4H), 7.98 (d, J=8.1 Hz, 8H), 7.87 (s, 4H), 7.74 (d, J=8.0 Hz, 8H), 7.07 (d, J=7.9 Hz, 8H), 6.66 (d, J=7.9 Hz, 8H), 2.87 (s, 12H), 2.10 (s, 12H). The characterization data matched the literature report.

Figure 15:
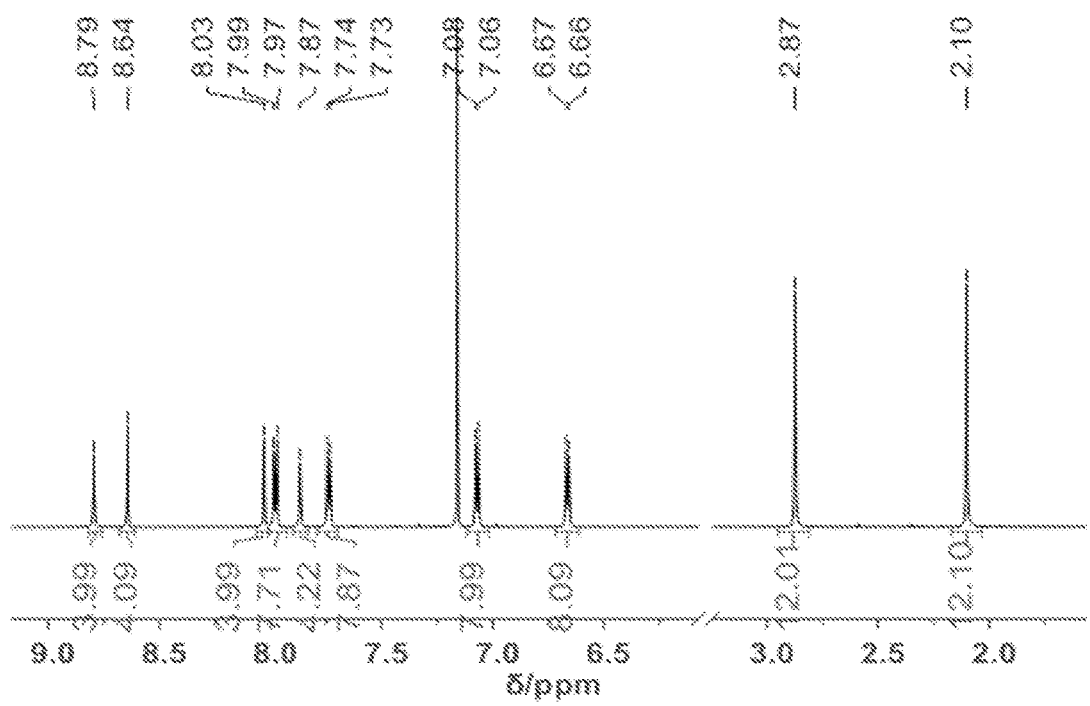
FIG. 15 illustrates $^1$H NMR (600 M, 298 K, $CDCl_3$) spectrum of OTs-NiPc.

FIG. 15 illustrates $^1$H NMR (600 M, 298 K, CDCl$_3$) spectrum of OTs-NiPc.

Synthesis of NiOAPc: To a 50 mL round bottom flask charged with 1.0 g (0.51 mmol) of 2,3,9,10,16,17,23,24-octatosylaminophthalocyanine Ni(II), 3 mL of deionized water and 30 mL of concentrated H$_2$SO$_4$ were successively added. The mixture was then heated at 110° C. for about 1.5 hour. The reaction was then cooled to room temperature, and the reaction mixture was poured into ice water (50 mL). The green precipitate was collected by centrifugation and the solid was washed thoroughly with deionized water (20 mL×3), 10% NaOH (20 mL×3), deionized water (20 mL×3), and acetone (20 mL×3) sequentially with the help of a vortex. The product NiOAPc was obtained as a purple to black powder (327 mg, 93%). $^1$H NMR (600 MHz, DMSO-$d_6$): δ=8.36 (s, 8H), 5.83 (br, 16H). $^{13}$C NMR (150 MHz, 298K, DMSO-$d_6$): δ=145.1, 138.9, 129.8, 129.3, 105.5.

Figure 16:
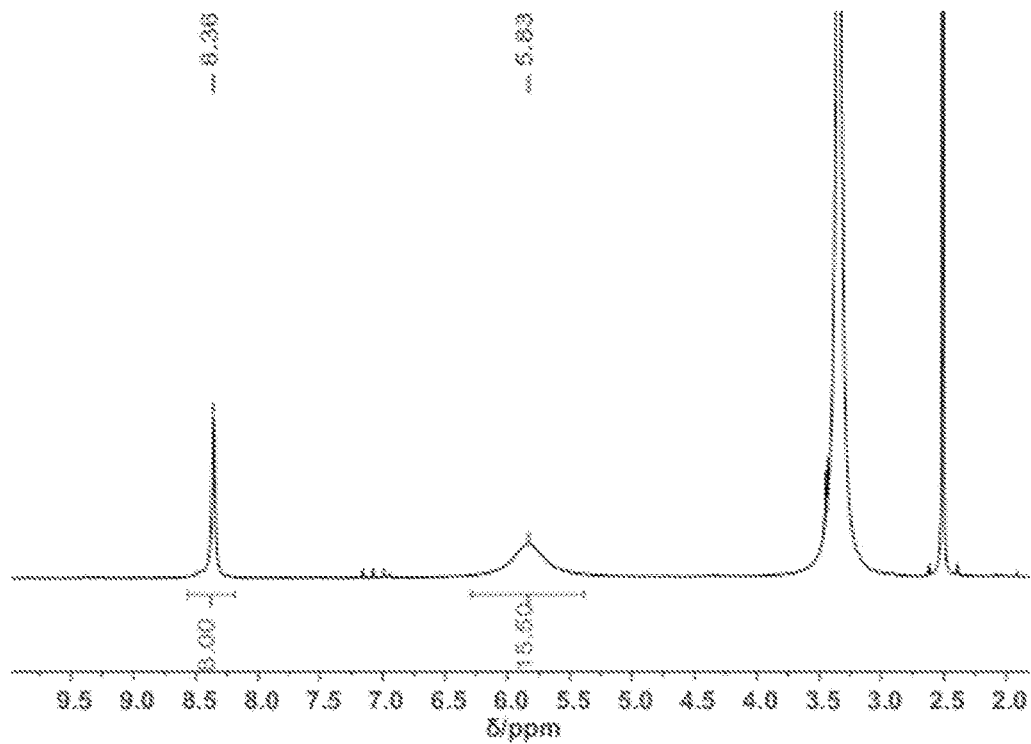
FIG. 16 illustrates $^1$H NMR (600 M, 298 K, dimethyl sulfoxide-$d_6$ (DMSO-$d_6$)) spectrum of NiOAPc.
Figure 17:
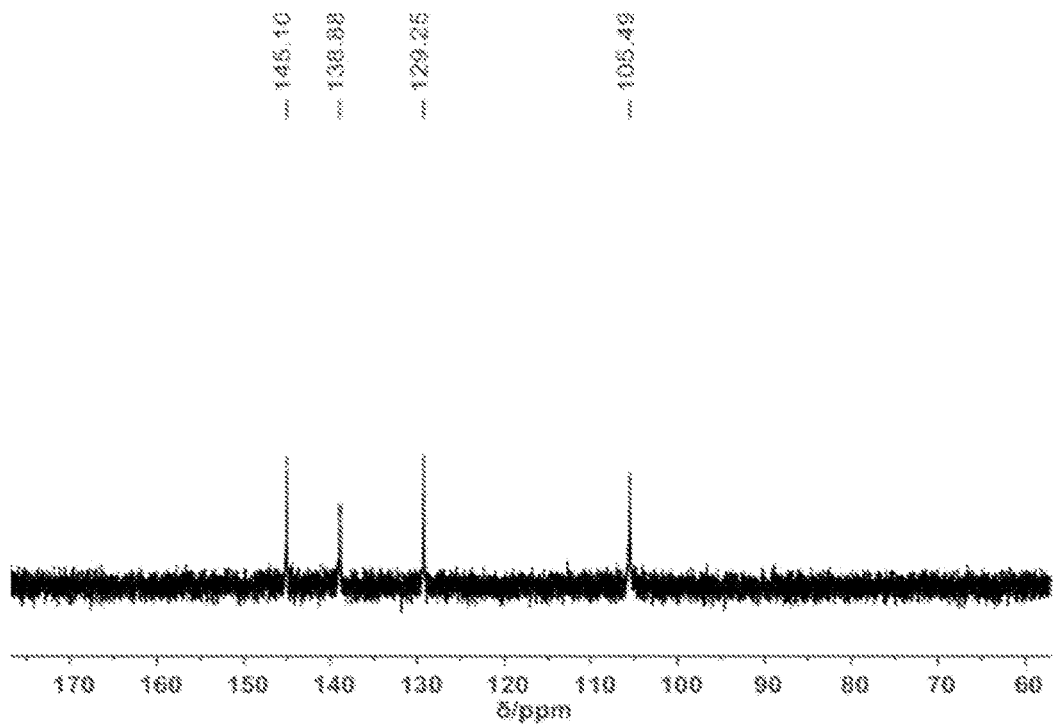
FIG. 17 illustrates $^{13}$C NMR (150 M, 298 K, DMSO-$d_6$) spectrum of NiOAPc.

FIG. 16 illustrates $^1$H NMR (600 M, 298 K, DMSO-$d_6$) spectrum of NiOAPc, while FIG. 17 illustrates $^{13}$C NMR (150 M, 298 K, DMSO-$d_6$) spectrum of NiOAPc.

Synthesis of 2,3,9,10,16,17,23,24-octatosylaminophthalocyanine Co(II) (OTs-CoPc): The synthesis of the 2,3,9,10,16,17,23,24-octatosylaminophthalocyanine Co(II) was similar with that of 2,3,9,10,16,17,23,24-octatosylaminophthalocyanine Ni(II). To a suspension of 4.01 g (8.6 mmol) of N,N'-(4,5-dicyano-1,2-phenylene)bis(4-methylbenzenesulfonamide) and 1.12 g of anhydrous CoCl$_2$ (8.6 mol, 1.0 eq) in n-hexanol (12 mL) in a glass pressure vessel, 4 mL of DBU (1,8-Diazabicyclo[5.4.0]undec-7-ene) was added. The system was purged with $N_2$ for 10 minutes and then sealed. The reaction vessel was then heated at 180° C. under $N_2$ for 36 hours. Upon cooling to room temperature, the reaction mixture was dissolved in 250 mL mixed solvent of acetic acid and CH$_2$Cl$_2$ (v/v=1:5). The organic extract was washed with water (200 mL×3) and then evaporated to dryness to generate an emerald-colored solid. The residual high boiling point hexanol remaining in the solid was removed by repeatedly dispersing the solid in 40 mL of CH$_2$Cl$_2$/petroleum ether mixture (v/v=1:3) and decanting the brownish solvent. The emerald-colored crude product was first passed through a short flash column chromatography (silica gel, CH$_2$Cl$_2$), and then the product was collect and recrystallized in 30 mL of CH$_2$Cl$_2$/methanol (v/v=1:3) to OTs-CoPc give as a blue crystals (0.97 g, yield 51%). $^1$H NMR (600 MHz, 298K, CDCl$_3$) δ=10.56 (s, 4H), 9.91 (s, 4H), 9.81 (s, 4H), 9.36 (s, 4H), 9.07 (d, J=7.9 Hz, 8H), 8.41 (d, J=7.9 Hz, 8H), 7.40 (d, J=7.7 Hz, 7H), 6.61 (d, J=7.7 Hz, 8H), 3.31 (s, 12H), 1.98 (s, 12H). $^{13}$C NMR (150 MHz, 298K, CDCl$_3$) δ=146.65, 144.01, 138.11, 136.39, 135.37, 133.20, 131.72, 129.63, 128.19, 127.35, 123.79, 122.46, 22.87, 21.51.

Figure 18:
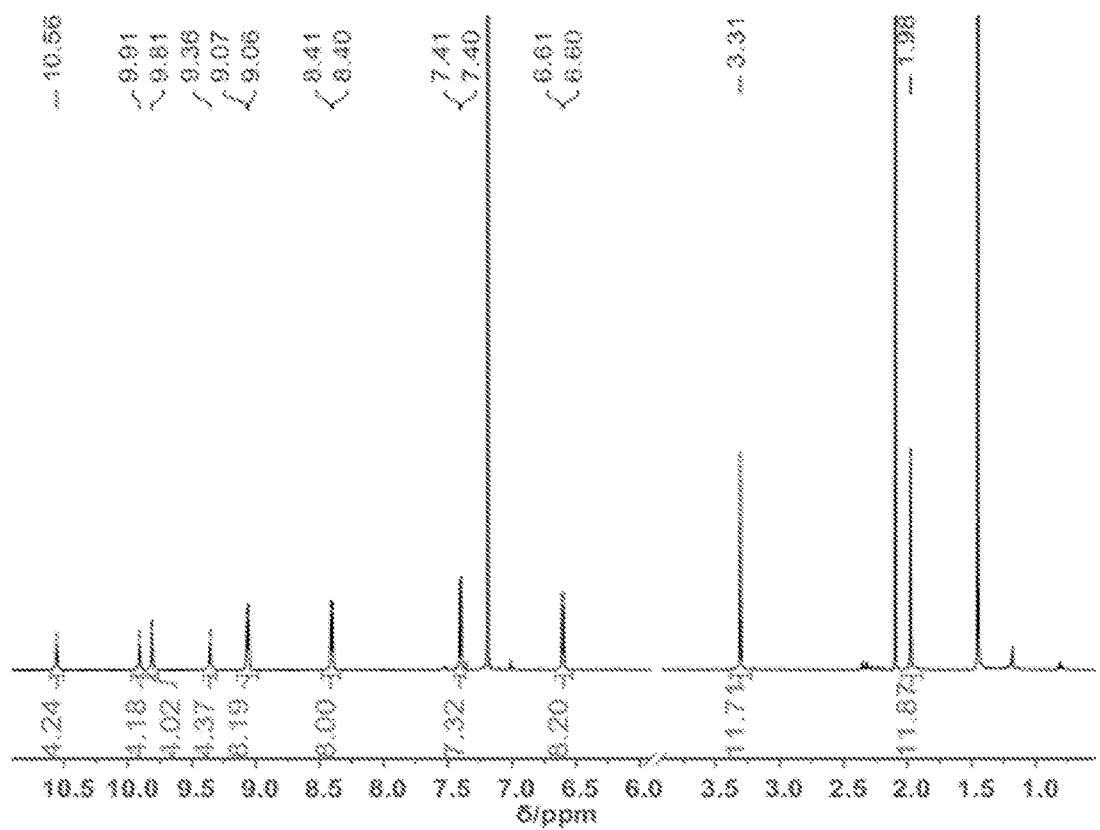
FIG. 18 illustrates $^{13}$C NMR (600 M, 298 K, $CDCl_3$) spectrum of OTs-CoPc.
Figure 19:
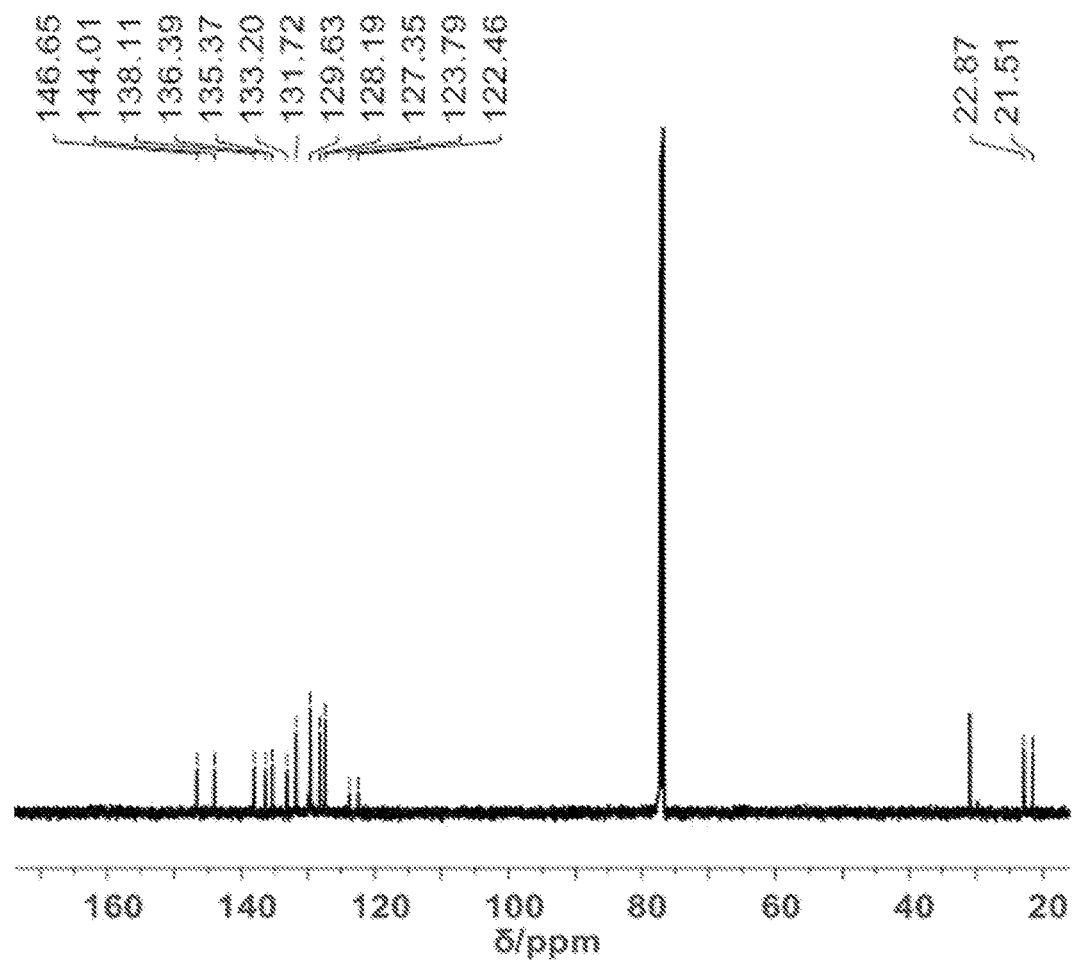
FIG. 19 illustrates $^{13}$C NMR (150 M, 298 K, $CDCl_3$) spectrum of OTs-CoPc.

FIG. 18 illustrates $^{13}$C NMR (600 M, 298 K, CDCl$_3$) spectrum of OTs-CoPc, while FIG. 19 illustrates $^{13}$C NMR (150 M, 298 K, CDCl$_3$) spectrum of OTs-CoPc.

Example 3.2. Synthesis of MPc-M-NH MOFs

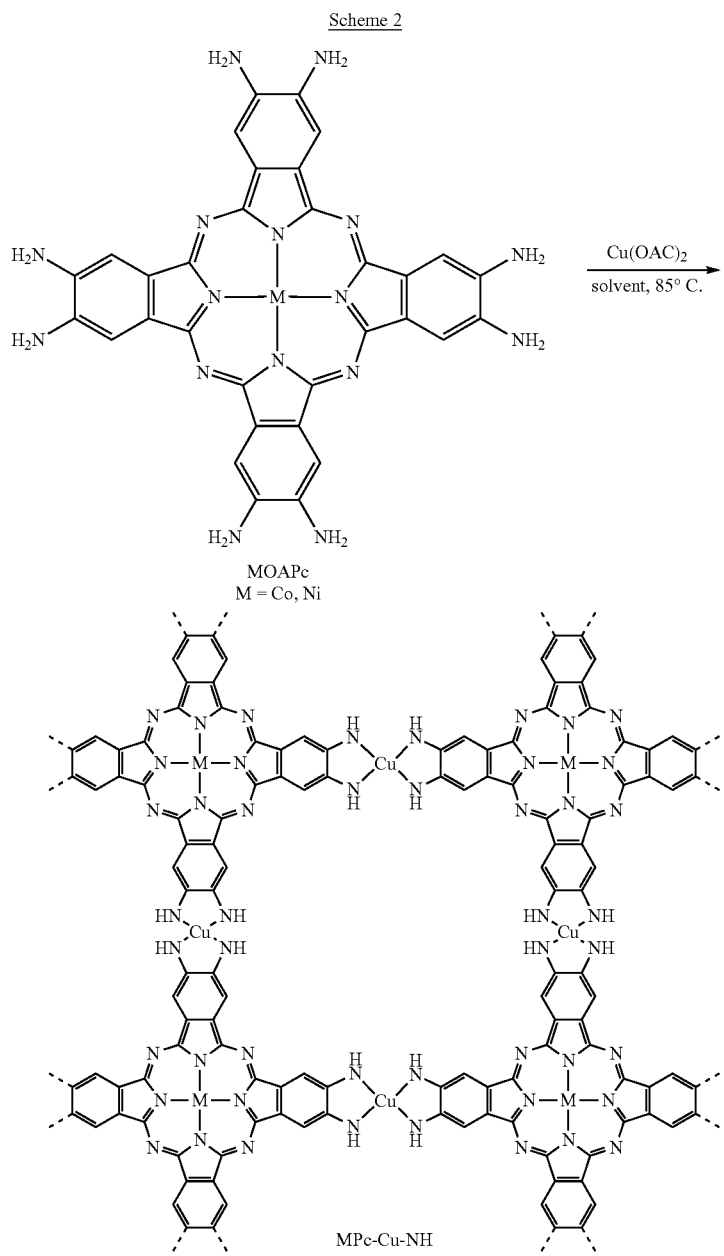

Synthesis of NiPc-Cu—NH MOF: NiOAPc (21 mg, 0.03 mmol) and Cu(OAc)$_2$ (14 mg, 0.075 mmol) were dissolved in 20 mL of DMSO. The solution was heated to 60° C. for 12 hours under air. After cooling to room temperature, the resulting black powder was collected by filtration and the solid was washed thoroughly with hot DMSO (5 mL×3), deionized water (20 mL×3), and acetone (20 mL×3) sequentially, giving the NiPc-Cu—NH as a black solid (26 mg, 105%).

Example 3.3. Characterization of NiPc-Cu—NH MOF

Powder X-ray diffraction (PXRD) data of NiPc-Cu—NH was collected using a Rigaku sixth generation MiniFlex X-ray diffractometer. Cu Kα radiation (λ=1.5406 Å; 600 W, 40 kV, 15 mA) was focused using a planar Göbel mirror riding the Kα line.

Figure 20:
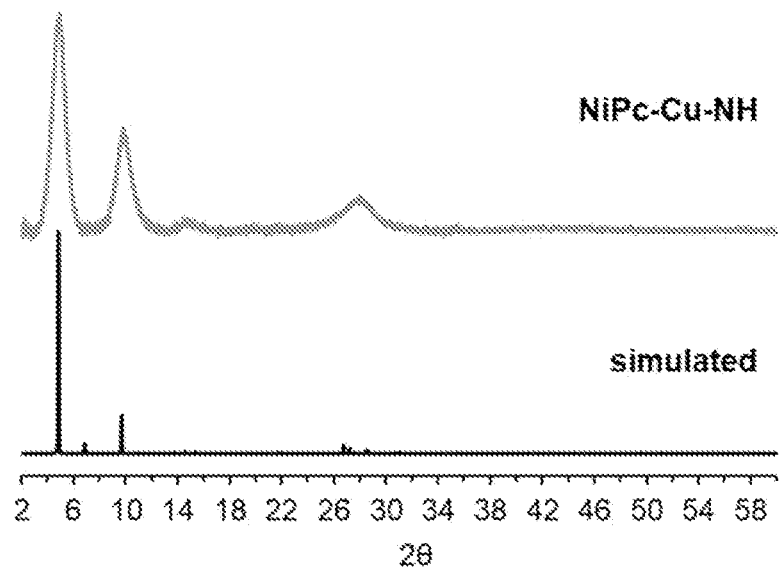
FIG. 20 illustrates experimental (green line) and simulated PXRD pattern (black line) of NiPc-Cu—NH.

FIG. 20 illustrates experimental and simulated PXRD pattern of NiPc-Cu—NH.

Without further elaboration, it is believed that one skilled in the art can, using the description herein, utilize the present disclosure to its fullest extent. The embodiments described herein are to be construed as illustrative and not as constraining the remainder of the disclosure in any way whatsoever. While the embodiments have been shown and described, many variations and modifications thereof can be made by one skilled in the art without departing from the spirit and teachings of the invention. Accordingly, the scope of protection is not limited by the description set out above, but is only limited by the claims, including all equivalents of the subject matter of the claims. The disclosures of all patents, patent applications and publications cited herein are hereby incorporated herein by reference, to the extent that they provide procedural or other details consistent with and supplementary to those set forth herein.

What is claimed is:

1. A method of detecting an analyte in a sample, said method comprising:
    associating the sample with a bimetallic metal-organic framework,
        wherein the bimetallic metal-organic framework comprises:
            a plurality of first metals, and
            a plurality of metal-containing ligands, wherein each metal-containing ligand comprises:
                a second metal, and
                a ligand,
                    wherein the ligand comprises a central portion, a first end, and a second end,
                    wherein the central portion is coordinated with the second metal, and
                    wherein the first end and the second end are each coordinated with the first metals, and
            wherein the bimetallic metal-organic framework comprises a network of metal-containing ligands that are interconnected with one another through coordination of ligands with first metals;
    detecting a change in a property of the bimetallic metal-organic framework; and
    correlating the change in the property of the bimetallic metal-organic framework to the presence or absence of the analyte in the sample.

2. The method of claim 1,
    wherein the associating occurs by a method selected from the group consisting of flowing the sample through the bimetallic metal-organic framework, incubating the sample with the bimetallic metal-organic framework, incubating the sample with the bimetallic metal-organic framework, and combinations thereof;
    wherein the sample is in a gaseous form, a liquid form, a solid form, or combinations of such forms; and
    wherein the analyte is in a gaseous state, a liquid state, or combinations of such states.

3. The method of claim 1, wherein the change in the property of the bimetallic metal-organic framework comprises a change in normalized conductance of the bimetallic metal-organic framework, wherein the change in normalized conductance is characterized by the following formula: $-\Delta G/G_0 = -(I_0-I)/I_0 \times 100\%$, wherein $\Delta G$ represents a change in conductance, $G_0$ represents initial conductance, $I_0$ represents initial electric current through the device before exposure to anayte, and I represents electric current during the course of the experiment.

4. The method of claim 1, wherein the correlating comprises comparing the change in the property of the bimetallic metal-organic framework to properties of bimetallic metal-organic framework associated with known analytes, wherein the comparing occurs by comparing the change in the property of the bimetallic metal-organic framework to a database comprising properties of bimetallic metal-organic framework associated with known analytes.

5. The method of claim 1, wherein the analyte is selected from the group consisting of $NH_3$, $H_2S$, CO, NO, and combinations thereof.

6. The method of claim 1, wherein the analyte is detectable at concentrations that range from about 10 nM to about 100 μM.

7. The method of claim 1, wherein the method is utilized for the simultaneous detection of a plurality of different analytes.

8. The method of claim 1, wherein the method is utilized to quantify the concentration of the analyte.

9. The method of claim 1, wherein the method is utilized for the selective detection of analytes in the presence of water.

10. The method of claim 1, wherein the first metals and the second metal are each independently selected from the group consisting of divalent metals, transition metals, iron, nickel, copper, cobalt, zinc, manganese, platinum, palladium, gold, bismuth, chromium, magnesium, tin, and combinations thereof.

11. The method of claim 1, wherein the first metals are in the form of metallic nodes.

12. The method of claim 1, wherein the second metal is different from the first metals.

13. The method of claim 1, wherein the second metal is the same as the first metals.

14. The method of claim 1, wherein the ligand is selected from the group consisting of organic ligands, hexatopic ligands, octatopic ligands, polydentate ligands, aromatic ligands, phthalocyanine-based ligands, metallophthalocyanine-based ligands (MPc), metallonaphthalocyanine-based ligands (MNPc), porphyrin-based ligands, metalloporphyrin-based ligands (MPP), naphthalocyanine-based ligands, tridentate ligands, triphenylene-based ligands, triphenylene derivatives, hexahydroxytriphenylene-based organic linkers, hexaiminotriphenlyene-based organic linkers, thiol-based ligands, and combinations thereof.

15. The method of claim 1, wherein the ligand is selected from the group consisting of metallophthalocyanine-based ligands (MPc), metallonaphthalocyanine-based ligands (MNPc), and combinations thereof.

16. The method of claim 1, wherein the first metals comprise first metals that are each coordinated with at least two ligands.

17. The method of claim 1, wherein the bimetallic metal-organic framework is associated with at least one electrode component, wherein the electrode component comprises an electrode surface.

18. The method of claim 1, wherein the bimetallic metal-organic framework serves as an electrode surface.

19. The method of claim 1, wherein the bimetallic metal-organic framework serves as an electrocatalyst, and wherein the bimetallic metal-organic framework mediates an electrocatalysis of the analyte.

* * * * *